(12) United States Patent
Hirt et al.

(10) Patent No.: US 7,016,403 B2
(45) Date of Patent: Mar. 21, 2006

(54) APPARATUS AND METHOD FOR DETERMINING THE QUALITY OF A DIGITAL SIGNAL

(75) Inventors: Walter Hirt, Wettswil (CH); Fritz Gfeller, Bonstetten (CH)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 09/902,553

(22) Filed: Jul. 10, 2001

(65) Prior Publication Data

US 2002/0031093 A1   Mar. 14, 2002

(30) Foreign Application Priority Data

Jul. 10, 2000   (EP) .................................. 00810602

(51) Int. Cl.
*H04B 17/00*   (2006.01)
*H04B 3/46*   (2006.01)
*H04Q 1/20*   (2006.01)

(52) U.S. Cl. .................................. 375/224; 340/870.18
(58) Field of Classification Search ................ 375/224, 375/225, 226, 231, 236, 239, 371, 373, 376, 375/340; 370/359, 360; 327/165, 170, 172, 327/175
See application file for complete search history.

(56) References Cited

U.S. PATENT DOCUMENTS

| | | | |
|---|---|---|---|
| 3,987,422 A * | 10/1976 | Yanagidaira et al. .. | 340/870.18 |
| 5,280,637 A | 1/1994 | Larosa et al. | |
| 5,297,164 A * | 3/1994 | McCabe ..................... | 375/224 |
| 5,566,022 A | 10/1996 | Segev ......................... | 359/172 |
| 5,719,904 A * | 2/1998 | Kim ............................ | 375/340 |
| 5,761,254 A * | 6/1998 | Behrin ........................ | 375/355 |
| 5,903,605 A * | 5/1999 | Crittenden ................. | 375/226 |
| 6,549,598 B1 * | 4/2003 | Kumaki ...................... | 375/376 |
| 6,580,775 B1 * | 6/2003 | Park et al. .................. | 375/375 |
| 6,625,231 B1 * | 9/2003 | Shen ........................... | 375/316 |

FOREIGN PATENT DOCUMENTS

EP   0289384   11/1988

(Continued)

OTHER PUBLICATIONS

"Design Considerations For Broadband Indoor Infrared Wireless Communication Systems", Pakravan et al., International Journal of Wireless Information Networks, vol. 2, No. 4, 1995.

(Continued)

*Primary Examiner*—Mohammed Ghayour
*Assistant Examiner*—Krista Flanagan
(74) *Attorney, Agent, or Firm*—Satheeoh K. Karra; Louis J. Percello; David Aker

(57) ABSTRACT

An apparatus and method for determining the quality of a digital signal. The incoming digital signal is sampled with a number n of samples per defined pulse width, where N is greater than or equal to one, using clock cycles. An edge detector detects the edge position of a pulse of the sampled digital signal and a counter counts the clock cycles between at least a first edge and a second edge detected by the edge detector. A deviation detector then compares the counted clock cycles with a prestored reference-value in order to provide a deviation value as a measure for the instantaneous quality of the digital signal. The deviation value is then fed to a rework unit that outputs a value that is a measure for the quality of the digital signal.

23 Claims, 12 Drawing Sheets

FOREIGN PATENT DOCUMENTS

| | | |
|---|---|---|
| JP | 53-15175 | 2/1978 |
| JP | 59-158657 | 9/1984 |
| JP | 59-171230 | 9/1984 |
| JP | 59-171233 | 9/1984 |
| JP | 62-12216 | 1/1987 |
| JP | 62-131637 | 6/1987 |
| JP | 05-75653 | 3/1993 |
| JP | 05-102953 | 4/1993 |
| JP | 05-235910 | 9/1993 |
| JP | 07-177151 | 7/1995 |
| JP | 2001-289892 | 10/2001 |
| WO | WO99/39216 | 8/1999 |

OTHER PUBLICATIONS

"Wireless Infrared Communication Links Using Multi-Beam Transmitters And Imaging Receivers", Tang et al., IEEE International Conference on Communications, 1996.

"Angle Diversity For Nondirected Wireless Infrared Communication", Carruthers et al., IEEE Transactions on Communications, 1998.

"Angle Diversity To Combat The Ambient Noise In Indoor Optical Wireless Communication Systems", Valadas et al., International Journal Of Wireless Information Networks, vol. 4, No. 4, 1997.

* cited by examiner

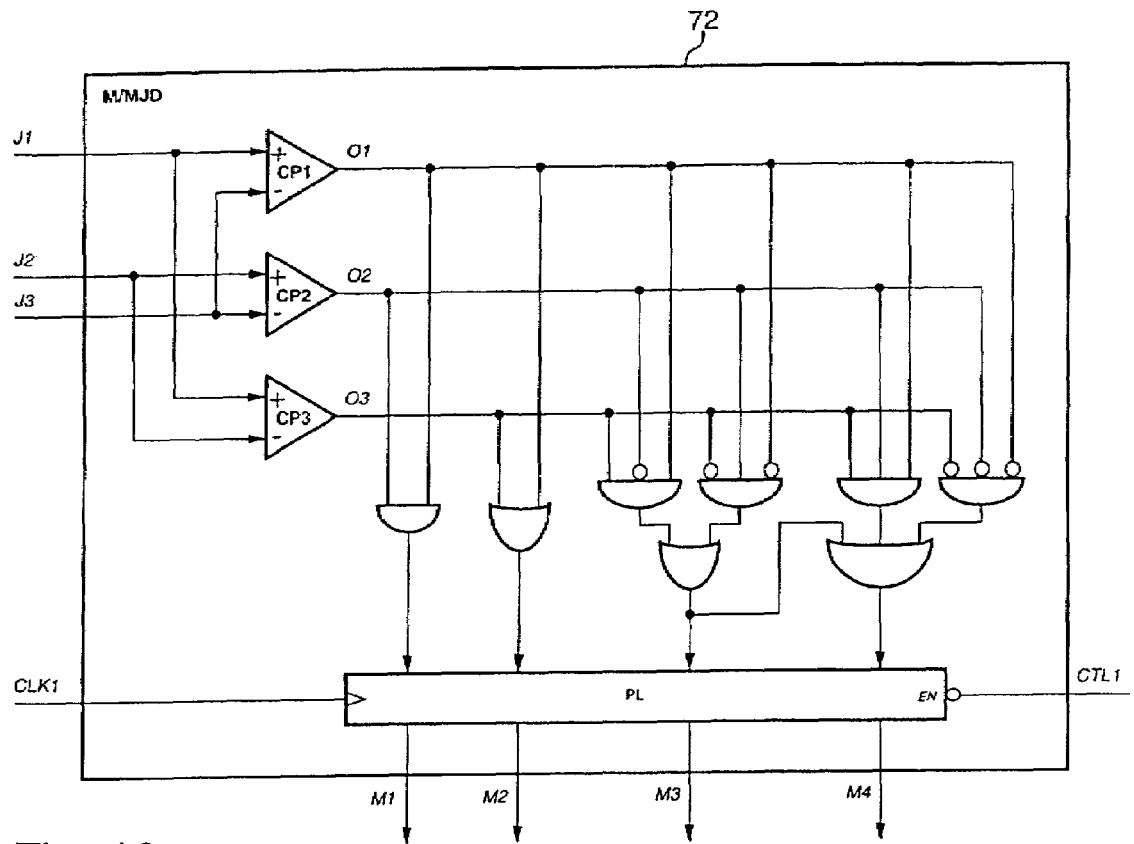
Fig. 10
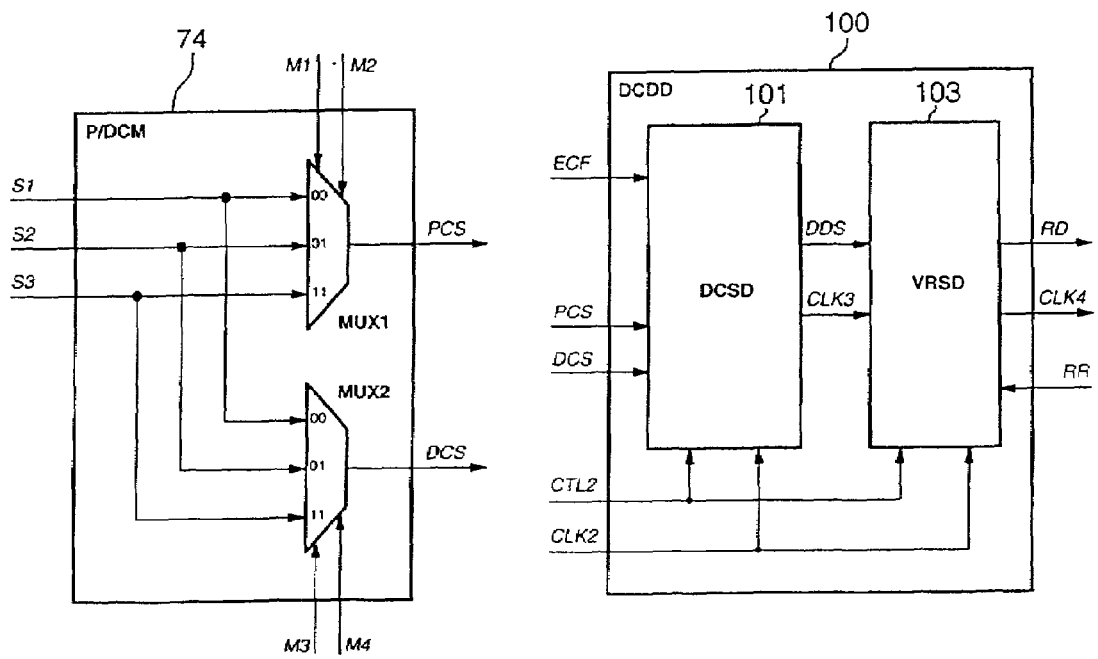
Fig. 11
Fig. 12

Fig. 17

| ROM_0 | | PCS = {L1p, L2p, L3p, L4p} ⇔ {0, 0, 0, 0} = 0, {0, 0, 0, 1} = 1, ... , {1, 1, 1, 1} = 15 | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| DCS = {L1d, L2d, L3d, L4d} ⇔ {0, 0, 0, 0} = 0, {0, 0, 0, 1} = 1, ... , {1, 1, 1, 1} = 15 | 0 | 4 | 4 | 3 | 4 | 2 | 2 | 3 | 4 | 1 | 1 | 3 | 3 | 2 | 2 | 1 | 3 |
| | 1 | 4 | 4 | 3 | 4 | 2 | 4 | 2 | 4 | 1 | 4 | 1 | 4 | 1 | 4 | 2 | 4 |
| | 2 | 3 | 4 | 3 | 3 | 2 | 4 | 3 | 3 | 1 | 4 | 3 | 3 | 2 | 2 | 3 | 3 |
| | 3 | 3 | 4 | 3 | 4 | 2 | 4 | 3 | 3 | 1 | 4 | 3 | 4 | 1 | 4 | 3 | 3 |
| | 4 | 2 | 4 | 3 | 3 | 2 | 2 | 2 | 2 | 1 | 1 | 3 | 3 | 2 | 2 | 2 | 2 |
| | 5 | 4 | 4 | 3 | 4 | 2 | 2 | 2 | 4 | 1 | 4 | 1 | 4 | 2 | 2 | 2 | 4 |
| | 6 | 2 | 4 | 3 | 3 | 2 | 2 | 3 | 2 | 1 | 4 | 3 | 3 | 2 | 2 | 3 | 2 |
| | 7 | 4 | 4 | 3 | 4 | 2 | 2 | 3 | 4 | 1 | 4 | 3 | 4 | 2 | 4 | 2 | 4 |
| | 8 | 1 | 4 | 3 | 3 | 2 | 4 | 2 | 3 | 1 | 1 | 1 | 1 | 1 | 1 | 1 | 1 |
| | 9 | 4 | 4 | 3 | 4 | 2 | 4 | 3 | 4 | 1 | 1 | 1 | 4 | 1 | 1 | 1 | 4 |
| | 10 | 1 | 4 | 3 | 3 | 2 | 4 | 3 | 3 | 1 | 1 | 3 | 1 | 1 | 1 | 3 | 1 |
| | 11 | 3 | 4 | 3 | 4 | 2 | 4 | 3 | 3 | 1 | 4 | 1 | 4 | 1 | 4 | 1 | 3 |
| | 12 | 1 | 4 | 3 | 3 | 2 | 2 | 2 | 2 | 1 | 1 | 1 | 1 | 2 | 1 | 2 | 1 |
| | 13 | 2 | 4 | 3 | 4 | 2 | 2 | 2 | 2 | 1 | 1 | 1 | 1 | 1 | 1 | 1 | 2 |
| | 14 | 1 | 4 | 3 | 3 | 2 | 2 | 3 | 3 | 1 | 1 | 3 | 3 | 2 | 2 | 1 | 1 |
| | 15 | 2 | 4 | 3 | 4 | 2 | 2 | 2 | 4 | 1 | 1 | 3 | 3 | 2 | 2 | 1 | 1 |

Fig. 18

| ROM_1 | | PCS = {L1p, L2p, L3p, L4p} ⇔ {0, 0, 0, 0} = 0, {0, 0, 0, 1} = 1, ... , {1, 1, 1, 1} = 15 | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| DCS = {L1d, L2d, L3d, L4d} ⇔ {0, 0, 0, 0} = 0, {0, 0, 0, 1} = 1, ... , {1, 1, 1, 1} = 15 | 0 | 1 | 4 | 3 | 4 | 2 | 4 | 2 | 4 | 1 | 4 | 3 | 4 | 2 | 4 | 3 | 1 |
| | 1 | 4 | 4 | 3 | 4 | 2 | 4 | 3 | 4 | 1 | 4 | 3 | 4 | 2 | 4 | 1 | 4 |
| | 2 | 3 | 3 | 3 | 3 | 3 | 2 | 3 | 3 | 1 | 1 | 3 | 3 | 2 | 2 | 3 | 3 |
| | 3 | 4 | 4 | 3 | 4 | 4 | 4 | 3 | 4 | 1 | 4 | 3 | 4 | 2 | 4 | 3 | 4 |
| | 4 | 2 | 2 | 3 | 4 | 2 | 2 | 2 | 2 | 1 | 1 | 3 | 3 | 2 | 2 | 2 | 2 |
| | 5 | 4 | 4 | 2 | 4 | 2 | 2 | 2 | 4 | 1 | 4 | 3 | 4 | 2 | 2 | 2 | 4 |
| | 6 | 2 | 3 | 3 | 3 | 2 | 2 | 3 | 3 | 2 | 4 | 3 | 3 | 2 | 2 | 2 | 3 |
| | 7 | 4 | 4 | 3 | 4 | 2 | 4 | 3 | 4 | 4 | 4 | 3 | 3 | 2 | 2 | 2 | 4 |
| | 8 | 1 | 1 | 1 | 1 | 1 | 1 | 2 | 4 | 1 | 1 | 1 | 1 | 1 | 1 | 1 | 1 |
| | 9 | 4 | 4 | 1 | 4 | 1 | 4 | 4 | 4 | 1 | 1 | 1 | 1 | 1 | 1 | 1 | 1 |
| | 10 | 3 | 3 | 3 | 3 | 3 | 3 | 3 | 3 | 1 | 1 | 3 | 3 | 1 | 1 | 3 | 1 |
| | 11 | 4 | 4 | 3 | 4 | 3 | 4 | 3 | 3 | 1 | 1 | 3 | 3 | 1 | 4 | 3 | 3 |
| | 12 | 2 | 2 | 2 | 2 | 2 | 2 | 2 | 2 | 1 | 1 | 1 | 1 | 2 | 2 | 1 | 2 |
| | 13 | 4 | 4 | 2 | 4 | 2 | 2 | 2 | 2 | 1 | 1 | 1 | 1 | 4 | 2 | 1 | 2 |
| | 14 | 3 | 1 | 3 | 3 | 2 | 2 | 2 | 2 | 1 | 1 | 3 | 3 | 1 | 1 | 1 | 1 |
| | 15 | 1 | 4 | 3 | 4 | 2 | 4 | 3 | 4 | 1 | 1 | 3 | 2 | 2 | 1 | 1 | 1 |

APPARATUS AND METHOD FOR DETERMINING THE QUALITY OF A DIGITAL SIGNAL

TECHNICAL FIELD

The present invention is related to an apparatus and a method for determining the quality of a digital signal. More particularly, the invention relates to a scheme for the selection of the most suitable signals.

DESCRIPTION AND DISADVANTAGES OF PRIOR ART

During the transmission of data via a channel or media, e.g. via a wire, a fiber, radio frequency (RF), or infrared, there are several factors that may influence the transmitted data signal. Although the present invention is applicable in a broad variety of signal processing applications and is independent from the transmission channel it will be described with the focus put on an application to wireless optical communication.

Today, many devices and most mobile computers are equipped with wireless infrared facilities for communication links. Traditionally, infrared links have been classified according to whether they employ a directional or non-directional transmitter and receiver, and whether or not they rely upon the existence of an uninterrupted line-of-sight path between the receiver and the transmitter. At present, directed line-of-sight links, hereinafter abbreviated to LOS, are the most widely used. Because they employ directional transmitters and receivers, the path loss is minimized, and multipath distortion is usually negligible. A unit which is able to transmit and receive infrared signals is called a transceiver or transceiver module. Practical wireless infrared transceiver modules are often restricted to use one optical receiver, which might be a photodiode (PD) and one optical emitter, which might be a light emitting diode (LED).

The Infrared Data Association, abbreviated to IrDA, has developed standards for creating short-range, point-to-point, wireless infrared links for data communication between mobile devices. A further IrDA standard is "Advanced Infrared" (AIr) which introduces the possibility of multi-point connectivity with increased distance and angular range. The current implementation of the IrDA-AIr standard implies one single transceiver module with increased transmission distance and angular range (emission/reception characteristics) of up to 120 degrees, and a standard controller for handling physical layer functions and medium access control.

However, the sensitivity of such a single transceiver module is insufficient for operating under loss of LOS conditions, and the limited angular range is insufficient to provide full LOS connectivity in conference table scenarios with several mobile devices. This represents a serious drawback of mobile devices using infrared communication compared to forthcoming mobile devices with radio links, for example, as based on the "Bluetooth" standard. Network access devices using infrared links suffer from similar restrictions.

In principle, it is possible to apply weighted analog combining of the output signals from a photodiode array pointed in different directions (diversity reception) to improve angular range and signal quality. However, lumping a photodiode array with a 360 degree field-of-view into an integrated transceiver module increases cost and leads to a large component size which is difficult to place in a mobile device without obscuring the field-of-view. In addition, placing photodiodes at separate locations in a mobile device and connecting them with transmission lines is not feasible due to external noise pick-up that interferes with the weak analog signals produced by the photodiodes.

U.S. Pat. No. 5,566,022 is related to an infrared communication system. The system includes a plurality of infrared transceivers for receiving and transmitting infrared signals through the free air. A circuit determines the direction of arrival of the received signal and provides this information to a dedicated logic controller (DLC), for registration purposes and for controlling the respective infrared transmitter.

The article "Design Considerations for Broadband Indoor Infrared Wireless Communication Systems" by M. R. Pakravan and M. Kavehard in International Journal of Wireless Information Networks, Vol. 2, No. 4, 1995, discusses the effects of receiver direction and field-of-view on the channel parameters.

In the paper "Wireless Infrared Communication Links using Multi-Beam Transmitters and Imaging Receivers" by A. P. Tang, J. M. Kahn, Keang-Po Ho, of the IEEE International Conference on Communications, Jun. 23–27, 1996, Dallas, the use of imaging receivers in infrared links is analyzed.

The research report "Angle Diversity for Nondirected Wireless Infrared Communication" by J. B. Carruthers and J. M. Kahn, University of California, Berkeley, submitted to IEEE Transactions on Communications, discusses practical considerations for multi-element angle-diversity systems. Unfortunately, the report does not offer a practical solution to the present problem because it is based on highly complex and costly optical receiver arrays combined with analog high-order signal selection/concentration schemes.

The article "Angle Diversity to Combat the Ambient Noise in Indoor optical Wireless Communication Systems" by R. T. Valadas, A. R. Tavares, A. M. de Oliveira Duarte, in International Journal of Wireless Information Networks, Vol. 4, No. 4, 1997, suggests theoretical approaches to estimate several signal-to-noise ratios based on the analog current of several photodiodes.

All mentioned documents describe several theoretical approaches and simulations but these give no practical solution for the known technical problems.

U.S. Pat. No. 5,903,605 is related to a jitter detection method and apparatus for informing an adaptive equalizer that the correlated jitter of transmitted data exceeds a predetermined jitter value. A jitter detection circuit receives transmitted data symbol pulses and clock signal pulses. The jitter detection circuit then compares a specified edge (e.g., the falling edge) of an incoming data symbol pulse with the corresponding specified edge (e.g., the falling edge) of a clock signal pulse to determine if an original phase error between the incoming data symbol pulse and the clock signal pulse exists.

It is clear, that the determination of the phase error between the incoming data symbol pulse and clock signal pulse makes sense only and works only when data symbol pulses are received. With the describe scheme the quality of a digital signal which has been transmitted across a transmission channel cannot be determined.

Since the transmission of data signals across transmission media causes phase and amplitude distortions and also noise is added, there is a call for an innovative method that determines the quality of a digital signal and determines its presence in a reliable and fast way.

OBJECT OF THE INVENTION

It is an object of the invention to overcome the disadvantages of the prior art.

It is another object of the present invention to provide a method and apparatus for determining the quality of a digital signal, preferably an infrared signal, in order to achieve reliable communication links.

It is still another object of the present invention to select the best suited signal from several received signals:

It is yet another object of the present invention to determine whether data symbol pulses are present in a noisy received digital signal.

It is also an object of the present invention to select at least the best suited signal and the second-best suited signal from several received signals for further processing.

It is a further object of the present invention to present a receiver system and method which provides a sufficient or even better connectivity coverage than so-far known arrangements do.

SUMMARY AND ADVANTAGES OF THE INVENTION

The invention for achieving the objects is defined in the claims. Therein an apparatus and a method for determining the quality of a digital signal is defined.

Such a digital signal represents data in the form of frames whereby each frame comprises at least a header field containing a preamble and a data field. The preamble is identical for each received signal since it can be assumed that each received signal comes from the same source, i.e. from the same transmitter. In case where the received signals originate from different transmitters it is assumed that all transmitted signals adhere to the same standardized form of frames.

In general, the signal quality of each input channel is monitored during the preamble phase of an incoming digital signal comprising pulses or symbols. The signal quality is determined by continuously measuring the pulse jitter of the incoming pulse streams. The best signal with the least jitter is selected and used for clock and data synchronization. In addition, the best two signals are selected for further processing whereas, in case of three channels, the worst signal can be discarded. For infrared applications, the use of only two signals is justified by the observation that in systems with mainly line-of-sight operation at most two transceivers will detect significant signal power. The best signal, is to be considered as the signal with the lowest error rate or with the highest signal-to-noise ratio, which indicates that the signal is least influenced by noise or other distortions. It should be noted, that the best signal is not necessarily the strongest signal.

It is understood that jitter or pulse jitter means the deviation of the pulse width between a defined symbol pulse and a received symbol pulse that might be influenced by noise or other distortions during transmission. In addition, jitter or pulse jitter also means the deviation of the duration between pulse edges, e.g. rising edges, between a defined duration between pulse edges and a received duration between pulse edges that might be in influenced or causes by noise or other distortions during transmission or when the receiver is active but there is no transmitted signal. The deviation is derived in order to provide a base for the determination of a measure for the quality of the digital signal.

Basically, the quality of the digital signal is determined by a sampler using clock cycles for sampling a digital signal, an edge detector for detecting the edge position of a pulse of the sampled digital signal, a counter for counting the clock cycles between at least a first edge and a second edge detected by the edge detector, and a deviation detector that is able to compare the counted clock cycles with a prestored reference-value in order to provide a deviation value as a measure for the instantaneous quality of the digital signal. This deviation value is then fed to a rework unit that outputs a stored absolute deviation value that is a measure for the quality of the digital signal and also a measure for the presence or absence of transmitted signal comprising data symbol pulses. Such a rework unit may comprise an absolute-value limiter unit that outputs an absolute deviation value to a storage latch.

When the stored absolute deviation value is fed further to a leaky integrator, then the advantage occurs that the leaky integrator outputs a significant measure which can be used to judge the signal quality or can be used to determine the absence of a transmitted signal.

If the edge detector bases edge detection on a first sample value and at least one second sample value, then the advantage occurs that the edge detector does not only logic state transitions, but also pulses with a predefined pulse width can be detected. That means that very short pulses can be eliminated or discarded.

It is an advantage if the counter is an up-counter or a modulo counter, because then the counter can be realized in simple circuitry. This also applies to the deviation detector that comprises a comparator outputting a positive or negative deviation value.

When the digital signal is encoded by a pulse modulation, preferably a Pulse Position Modulation (PPM), then the advantage occurs that the data can be transmitted in the baseband and therefore no complex modulation techniques are necessary.

It is especially advantageous if the quality of the digital signal can be determined within the preamble, whereby this can be regarded as on-the-fly, because then nearly no delays occur and the best signal or signals can always be chosen immediately for further processing. It is clear, that not the full or entire preamble has to be used or investigated to determine the signal quality. The selection of the best suited signal or signals can be stopped if the start of a symbol within the preamble of the digital signal has been recognized. This means in particular that the selection of the best suited signal or signals is/are retained for the remainder of the incoming packet. As a further result of the signal quality measurement within nearly zero delay upon the preamble reception, the clock and data synchronization become significantly more reliable.

It is advantageous that the present scheme for determining the quality of a digital signal works for digital signals which base on noise. Therefore, practical applications in noise-influenced environments can be realized with reliable connectivity by eliminating channels that do not carry data information.

The present invention provides improved connectivity in wireless optical networks and is particularly suited for multi-point connectivity between mobile platforms or portable devices, e.g., laptop computers, hand-held devices, and fixed access points, e.g., repeater stations, printers, or peripheral equipment. A typical user scenario can be a round-table configuration comprising a plurality of stations in a conference room.

It is an advantage that communicating devices equipped with an apparatus according to the present invention will not need an alignment as accurate as before and are well suited for multipoint networking applications.

This patent application is related to another patent application, entitled "APPARATUS AND METHOD FOR DETERMINING A PULSE POSITION FOR A SIGNAL ENCODED BY A PULSE MODULATION", filed on the same day as the instant patent application, presently assigned to the assignee of the instant application and the disclosure of which is incorporated herein by reference. How the best two or more signals can be used for further processing with gain is disclosed in the mentioned patent application.

DESCRIPTION OF THE DRAWINGS

Preferred embodiments of the invention are described in detail below, by way of example only, with reference to the following schematic drawings.

FIG. 10 shows a schematics of the minimum-maximum detector that compares three values, generates the control signals for a first multiplexer circuit and a second multiplexer circuit, and stores them in storage latches.

FIG. 11 shows a schematics of the diversity multiplexer for selecting the first digital signal and the second digital signal.

FIG. 12 shows the basic blocks of the dual-channel data detector with a dual-channel symbol detector and a variable-rate data detector.

FIG. 17 shows an example of a precomputed probability table holding 4-PPM symbol values.

FIG. 18 shows a further example of a precomputed probability table holding 4-PPM symbol values.

Figure 1:
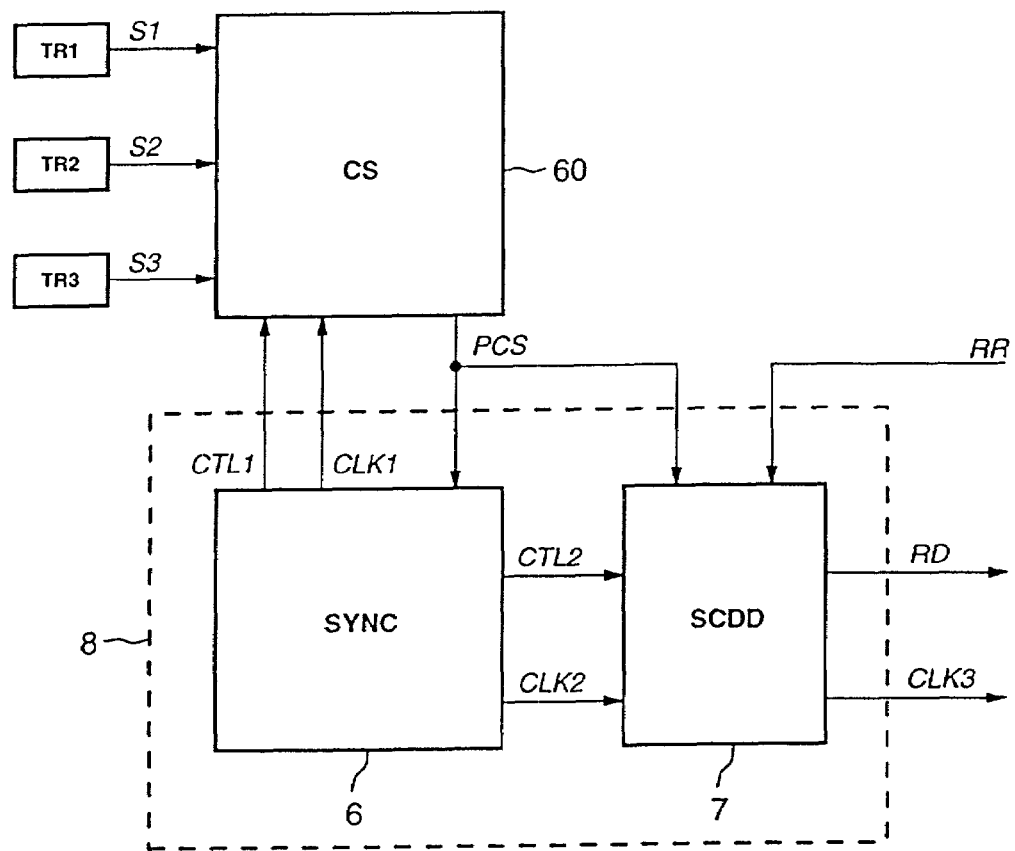
FIG. 1 shows a schematic illustration of an arrangement according to the present invention with three transceivers, the accompanying signals, a channel selector, and units for synchronization and data detection.

The drawings are provided for illustrative purpose only and do not necessarily represent practical examples of the present invention to scale.

DETAILED DESCRIPTION OF THE INVENTION

Although the present invention is applicable in a broad variety of signal processing applications it will be described with the focus put on an application to wireless optical communication, i.e. infrared communication. Before embodiments of the present invention are described, some basics, in accordance with the present invention, are addressed.

PPM—Pulse Position Modulation

A Pulse Position Modulation scheme, hereinafter abbreviated to PPM, is used in accordance with the present invention. It should be noted, that other modulations schemes can be used instead, especially advantageous are pulse modulations, e.g. Run-Length Limited codes, also abbreviated to RLL. The PPM provides a variable data rate with repetition coding. L-slot Pulse Position Modulation is achieved by defining a data symbol of duration $T_D$ seconds and subsequently subdividing the symbol into a set of L, e.g., L=2, 4, 8, 16, equal time slots of duration $T_D/L$ seconds, also called 'chips'. In L-PPM schemes, only one time slot, or chip, per symbol contains a pulse, which means a logical 'one' or '1'. The other chips contain no pulse, which means a logical 'zero' or '0'. If the base is defined as L=4, then the resulting modulation scheme is called four-slot Pulse Position Modulation or 4-PPM. Because there are four unique positions within each 4-PPM symbol, four independent symbols exist in which only one chip is logically '1' while all other chips are logically '0', whereby there are the following combinations: 1000, 0100, 0010, 0001. These four symbols are the only legal data symbols allowed in 4-PPM. Each data symbol represents two bits of a single data bit pair, which are respectively 00, 01, 10, 11. Logical '1' represents a chip duration when a transmitter is emitting light, while logical '0' represents a chip duration with no light emission.

The Preamble

A digital signal represents data carried in frames, whereby each frame comprises at least a data field and a header field which contains a preamble. The preamble comprises a periodic symbol sequence to allow for initial carrier sensing, symbol clock synchronization, and chip clock phase acquisition by a phase-locked loop, also referred to as PLL. This means in particular that the preamble is employed to obtain initial relative synchronization of a digital reception- and processing-unit, which is achieved by the transmission of a periodic sequence of pulses. A receiving station which knows how many slots each symbol comprises, is able to detect after a certain while the period of the sequence of pulses. Furthermore, the receiving station adjusts its slot or chip clock phase using a PLL. The preamble comprises a plurality of repeated transmissions, preferably 128 or more, of the following legal 4-PPM symbol P: P=1000. Every other combination is possible if it is use- or helpful, e.g. for additional information transmission. After the preamble may follow a synchronization field, a control field, the data field or other fields.

In the following, embodiments of the invention are described, whereby within the figures, same reference numerals are used to denote the same or like parts.

FIG. 1 shows a schematic illustration of an arrangement with three transceivers, labeled TR1, TR2, TR3, the accompanying output signals, labeled S1, S2, S3, respectively, a channel selector 60 and units for synchronization 6 and single-channel data detection 7. Each of the three transceivers delivers a binary-quantized signal to the channel selector 60 that delivers the one digital signal with the best signal quality measure, called the primary channel signal and hereafter abbreviated to PCS, to synchronization unit 6 and single-channel data detector 7. The synchronization unit 6 feeds a first control signal, hereafter abbreviated to CTL1, and a first clock signal, hereafter abbreviated to CLK1, to the channel selector 60. The synchronization unit 6 further feeds a second control signal, hereafter abbreviated to CTL2, and a second clock signal, hereafter abbreviated to CLK2, to the single-channel data detector 7. The latter outputs a received data signal, labeled RD, and a third clock signal, labeled CLK3. The single-channel data detector 7 receives as a further input a control signal, labeled RR, that carries information about the data rate reduction factor. The synchronization unit 6 and the single-channel data detector 7 are usually parts of a controller module 8 that contains further reception and transmission functions. In a further embodiment, the channel selector 60, the synchronization unit 6, and the single-channel data detector 7 can all be combined within such a controller module 8. Subsequently, the channel selector 60 and the synchronization unit 6 will be described in more detail.

Figure 1A:
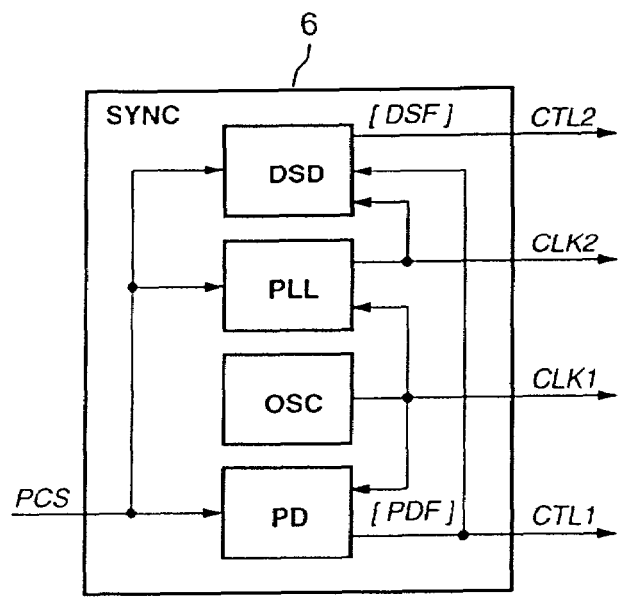
FIG. 1a shows a block diagram of the synchronization unit including a data synchronization detector, a phase-locked loop, an oscillator, and a preamble detector.

FIG. 1a shows in greater detail that the synchronization unit 6 introduced in FIG. 1 includes a data synchronization detector, labeled DSD, a phase-locked loop, labeled PLL, an oscillator, labeled OSC, and a preamble detector, labeled PD. The synchronization unit 6 has the PCS as an input and outputs control signals CTL1 and CTL2 and clock signals CLK1 and CLK2.

Figure 2:
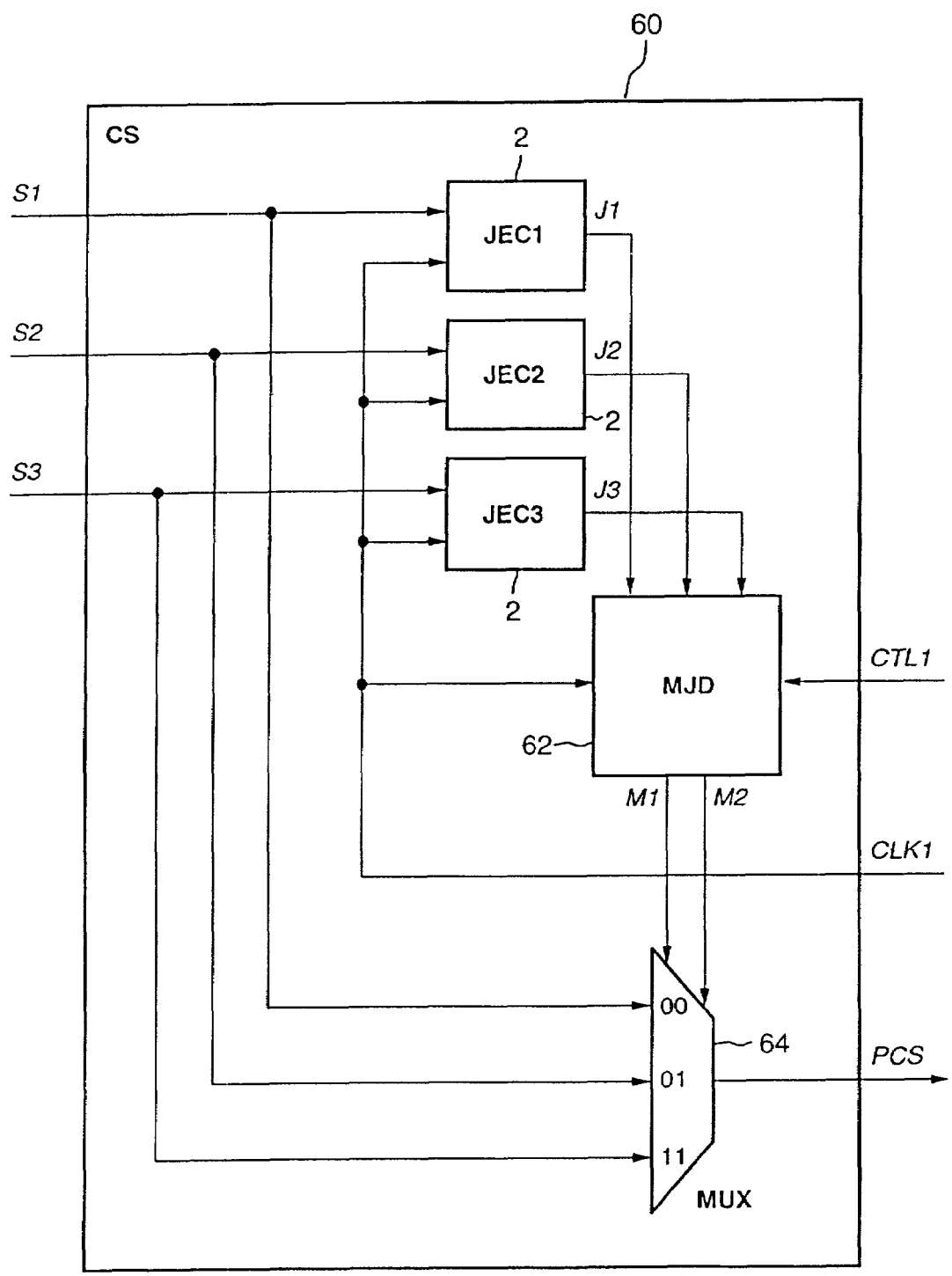
FIG. 2 shows a schematic illustration of the channel selector containing for each channel a jitter estimator, a minimum detector, and a primary multiplexer for the selection of one digital signal with the best signal quality measure.

FIG. 2 shows in more detail that the channel selector 60, also simply called selector 60, contains for each of the three channels a jitter estimator 2, a minimum detector 62, and a primary multiplexer 64 for the selection of the PCS. Each of the three jitter estimators 2 receives one binary input signal, labeled S1, S2, and S3, and outputs a channel quality measure, labeled J1, J2, and J3, respectively. These channel quality measures J1, J2, J3 are fed to and evaluated by the minimum detector 62 to generate the selection signals, labeled M1 and M2, that select the PCS at the output of the primary multiplexer 64. The three jitter estimators 2 are all driven by the clock signal CLK1 and the minimum detector 62 uses control signal CTL1 and clock signal CLK1. Subsequently, the jitter estimator 2 and the minimum detector 62 will be described in more detail.

Figure 3:
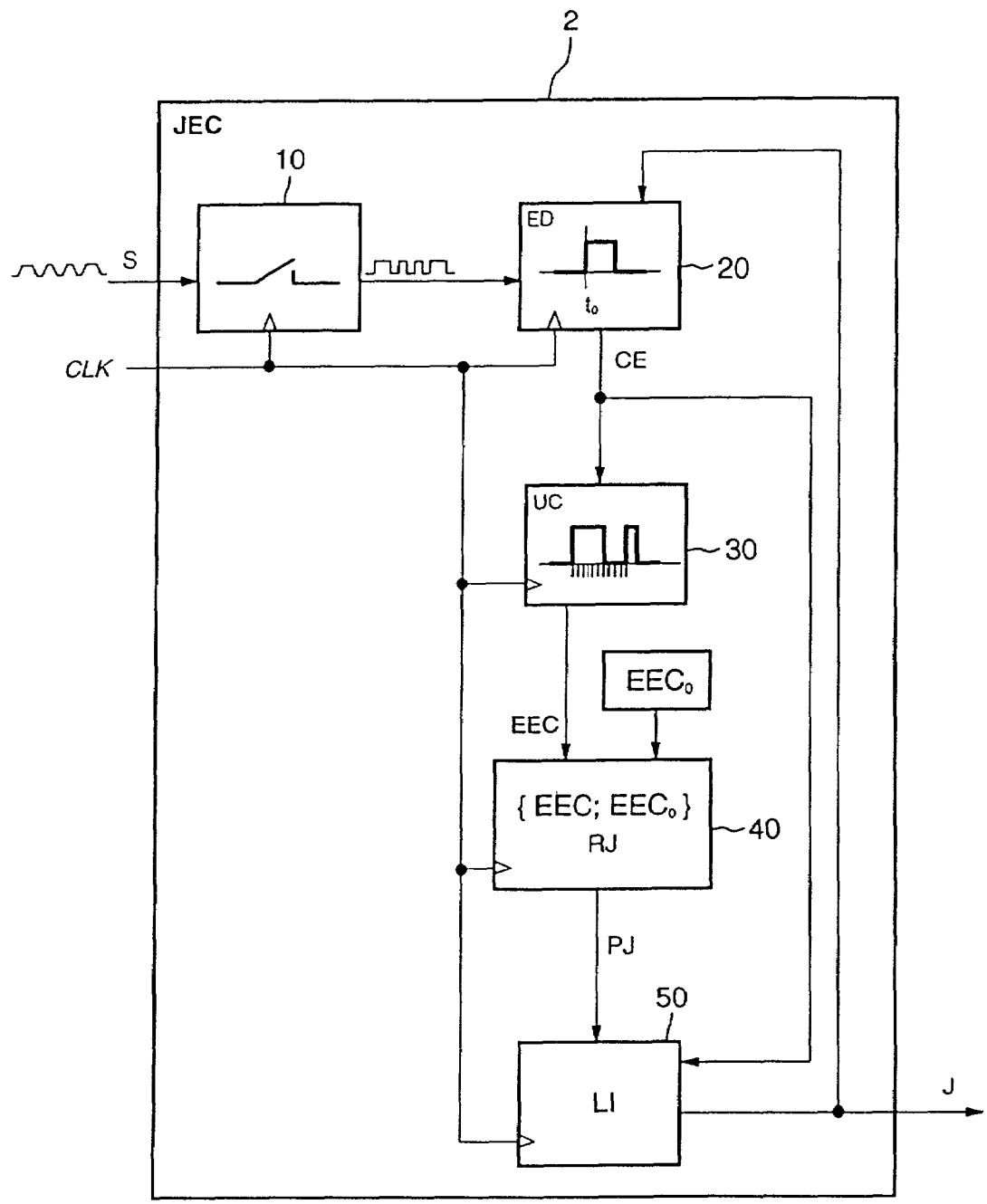
FIG. 3 shows the principal blocks of the jitter estimator including a sampler, an edge detector, a counter, a deviation detector, and a leaky integrator.

FIG. 3 shows the principal blocks of the jitter estimator 2 with a sampler 10, an edge detector 20, a counter 30, a deviation detector 40, and a leaky integrator 50. The sampler 10 uniformly samples a digital signal which is a binary-quantized input signal, labeled S, once for each cycle of the clock signal, labeled CLK, such that, for example, six samples result within the time span of a nominal 4-PPM pulse width of 125 ns. Note that the clock signal labeled CLK is also fed to the edge detector 20, the counter 30, the deviation detector 40, and the leaky integrator 50. Furthermore, the clock signal labeled CLK is identical with clock signal CLK1, the first clock signal delivered by the synchronization unit 6 shown in FIG. 1a. The sampler 10 feeds its output to the edge detector 20 which provides a state change in its output signal, labeled CE, during the one cycle of the clock signal CLK where the edge detector 20 identifies a defined edge in the samples provided by the sampler 10. The output signal CE of the edge detector 20 is fed to the counter 30 and the leaky integrator 50. Every state change in the output signal CE of the edge detector 20 that coincides with the identification of a defined edge resets the output of the counter 30, labeled EEC, to the value zero, otherwise the counter 30 increments its output by unity for each completed cycle of the clock signal CLK. The deviation detector 40 compares the output EEC of counter 30 with a prestored reference-value, labeled $EEC_0$, and determines the instantaneous deviation value $RJ=EEC-EEC_0$. The deviation detector 40 further processes the instantaneous deviation value RJ in a first step by retaining only its magnitude value |RJ| and in a second step by limiting this magnitude value to a defined maximum value $|RJ|_{MAX}$ when the magnitude value |RJ| exceeds $|RJ|_{MAX}$. Therefore, the output of the deviation detector 40, labeled PJ, is determined as PJ=|RJ| when $|RJ|<|RJ|_{MAX}$ or $PJ=|RJ|_{MAX}$ when $|RJ|\geq|RJ|_{MAX}$. The output PJ produced by the deviation detector 40 is identical with the input of the leaky integrator 50 whose output J provides a signal quality measure for the input signal S applied to the sampler 10. The output of the leaky integrator 50 is also fed back to the edge detector 20 to control the conditions for the detection of a defined edge. Subsequently, the edge detector 20, the deviation detector 40, and the leaky integrator 50, will be described in more detail.

Figure 4:
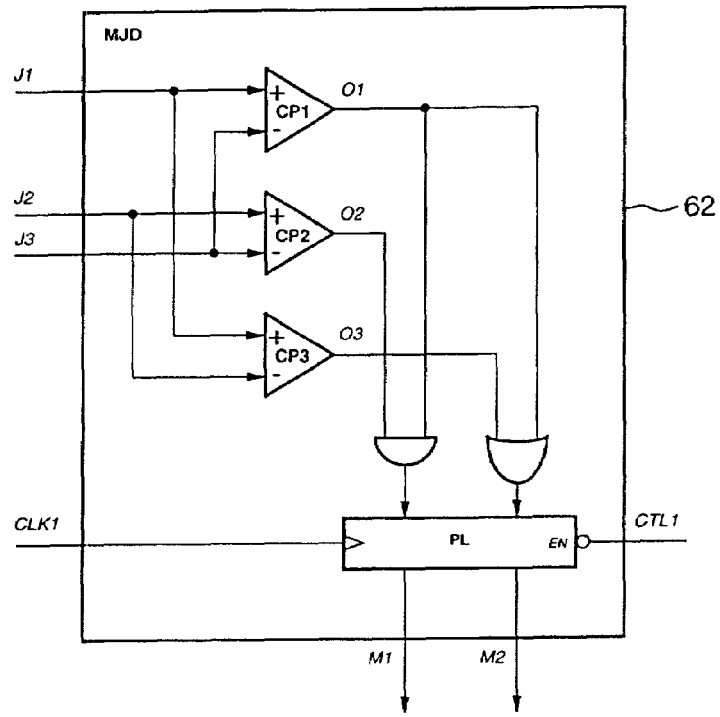
FIG. 4 shows the minimum detector that compares three values, generates the selection signals for the primary multiplexer, and stores them in storage latches.

FIG. 4 shows in detail a minimum detector 62 that compares three input values, labeled J1, J2, and J3, by using three comparators, labeled CP1, CP2, and CP3, that assign binary values to their outputs, labeled O1, O2, and O3, respectively. From these output values the selection signals for the primary multiplexer 64, labeled M1 and M2, are then generated by using digital logic circuits and storing the selection signals in storage latches, labeled PL, that are driven by the previously defined clock signal CLK1 and control signal CTL1. Note that the output of a comparator, CP1, CP2, or CP3, is only asserted (i.e., takes on the digital logic's TRUE level) when the comparator's positive input value, labeled +, is greater than its negative input value, labeled −.

Figure 5:
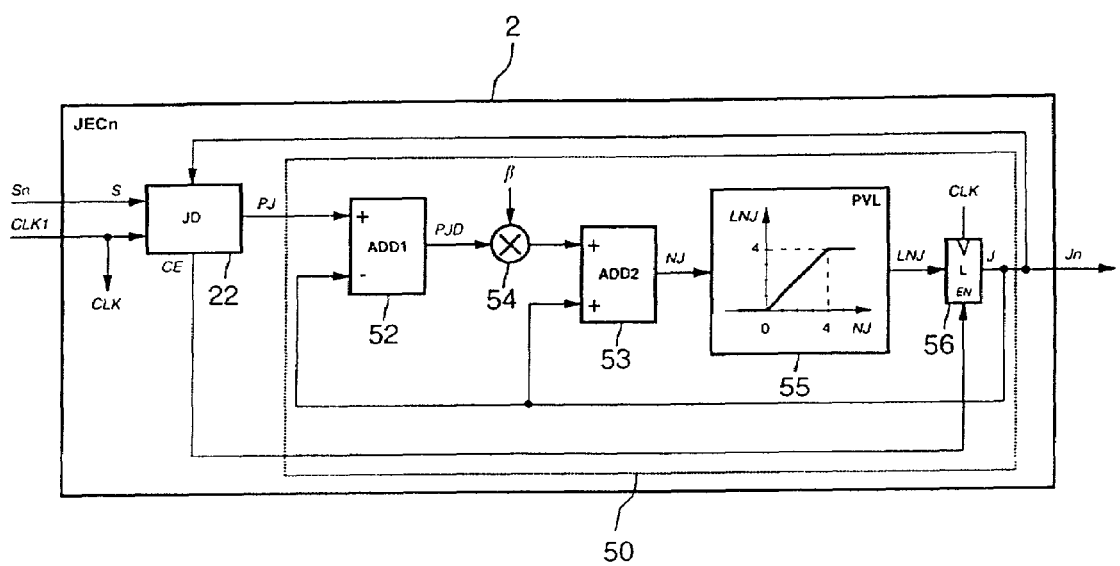
FIG. 5 shows the elements of the jitter estimator consisting of a jitter detector and the leaky integrator constructed with two adders, a leak factor multiplier, a positive value limiter, and a clocked storage latch.
Figure 6:
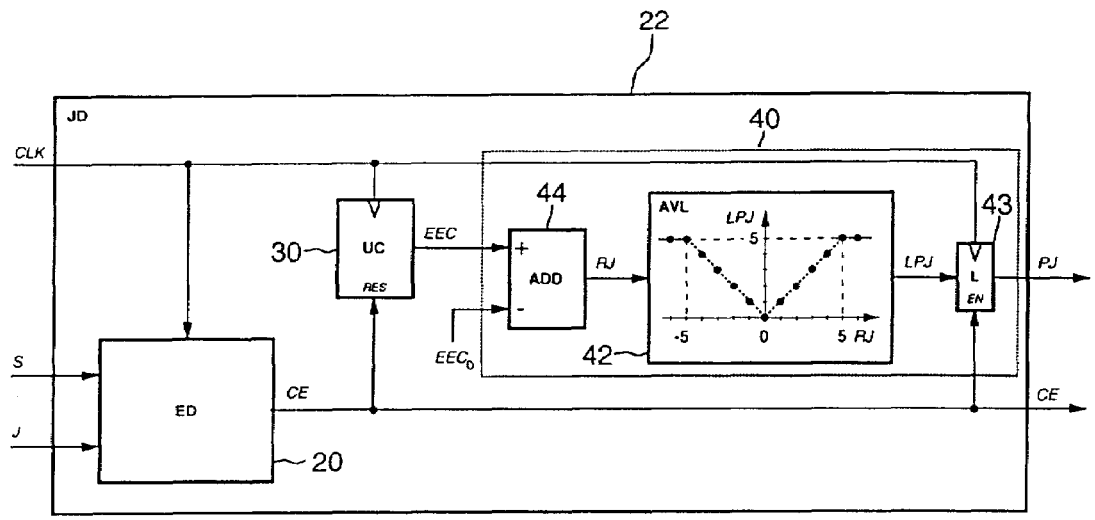
FIG. 6 shows a block diagram of the jitter detector whose output can be used to feed the leaky integrator where the jitter detector contains the edge detector, the counter, and the deviation detector comprising an adder, an absolute value limiter, and a clocked storage latch.

FIG. 5 shows the structure of the jitter estimator 2 with a jitter detector 22, described in further detail in FIG. 6, and a leaky integrator 50 that is constructed with two adders 52,53, a leak factor multiplier 54, a positive value limiter 55, and a clocked storage latch 56. The jitter estimator 2 receives a binary-quantized input signal, labeled Sn/S, together with the previously defined clock signal CLK1 that is internally labeled as CLK, and it feeds its output, labeled PJ, to the leaky integrator 50. The leaky integrator 50 operates according to the following basic equation: $J_{i+1}=(1-\beta)\times J_i+(\beta\times\Delta J_i)$ $=J_i+\beta\times(\Delta J_i-J_i)$, where $J_i$ is some value valid at time $\tau_i$, $J_{i+1}$ is some value valid at time $\tau_{i+1}$, $\beta$ is a leak factor in the range $0<\beta\leq 1$ preferably having a power-of-two form $2^{-m}$, m=0, 1, 2, . . . , and $\Delta J_i$ is some incremental value valid at time $\tau_i$. Note that the value $J_0$, the value of $J_i$ at initialization time $\tau_0$, is typically set to the value defined as the maximum output of the positive value limiter 55; for example, $J_0$=4 according to FIG. 5 since the output of the positive value limiter, labeled LNJ, is shown to be limited to four. The signal connections between the elements of the leaky integrator 50 are defined through the following equations: Jn=J←LNJ=f (NJ) where NJ=J+β×PJD=J+β×(PJ−J), f(NJ) represents the function of the positive value limiter 55, and the variables Jn, J, LNJ, NJ, and PJD are the signal labels shown in FIG. 5. Note also that the left-directed arrow ← used in the above update equations indicates a clock-induced output update of the storage latch 56. Whether or not the clock signal labeled CLK becomes active for the storage latch 56 depends on the state of its enabling input, labeled EN, that is identical with the output of the jitter detector 22, labeled CE. Also, depending on the chosen value for β and the number of logical bits used to represent the labeled signal variables in the jitter estimator 2, the positive value limiter 55 may not be necessary; in this case LNJ=f(NJ)=NJ. Furthermore, the initial output value of the jitter estimator 2 should be loaded into the storage latch 56 at initialization time $\tau_0$ such that, for example, Jn=J←$J_0$=4. Note that the output of the leaky integrator 50, labeled J, that provides a signal quality measure for the input signal Sn/S of the jitter estimator 2, is also fed back to the jitter detector 22 to control the conditions for the detection of a defined edge. Subsequently, the jitter detector 22 will be described in more detail.

FIG. 6 shows a detailed schematics of a jitter detector 22 as introduced in FIG. 5 whose inputs are the binary-quantized signal S, the signal quality measure J, and the clock signal CLK that is identical with the previously defined clock signal CLK1, the first clock signal delivered by the synchronization unit 6 shown in FIG. 1a. The outputs of the jitter estimator 22, labeled PJ and CE, are used by the leaky integrator 50 shown in FIG. 5. The jitter detector 22 is built with an edge detector 20 that is shown in more detail in FIG. 7, a counter 30, and a deviation detector 40 that includes an adder 44, an absolute value limiter 42, and a storage latch 43. The edge detector 20 provides a state change in its output signal, labeled CE, during the one cycle of the clock signal CLK where the edge detector 20 identifies a defined edge in the samples taken from the input signal S; the output signal CE is also fed to the counter 30 and the storage latch 43. Note that the clock signal labeled CLK is also fed to the counter 30 and the storage latch 43 within the deviation detector 40. Every state change in the output signal of the edge detector 20 that coincides with the identification of a defined edge resets the output of the counter 30, labeled EEC, to the value zero, otherwise the counter 30 increments its output by unity for each completed cycle of the clock signal CLK. The adder 44 compares the count EEC, the output of the counter 30, with a prestored reference-value, denoted $EEC_0$, and determines the instantaneous deviation value RJ=EEC−$EEC_0$. The positive value limiter 42 further processes the instantaneous deviation value RJ in a first step by retaining only its magnitude value |RJ| and in a second step by limiting this magnitude value to a defined maximum value $|RJ|_{MAX}$ when the magnitude value |RJ| exceeds $|RJ|_{MAX}$. Therefore, the output of the positive value limiter 42, labeled LPJ, is determined as LPJ=|RJ| when $|RJ|<|RJ|_{MAX}$ or LPJ=$|RJ|_{MAX}$ when $|RJ|\geq|RJ|_{MAX}$. Note that the output PJ produced by the deviation detector 40 is identical with the output of the storage latch 43 whose input is provided by the absolute value limiter 42 in the form of its output labeled LPJ. Whether or not the clock signal labeled CLK becomes active for the storage latch 43 depends on the state of its enabling input, labeled EN, that is identical with the output CE of the edge detector 20. Subsequently, the edge detector 20 will be described in more detail.

Figure 7:
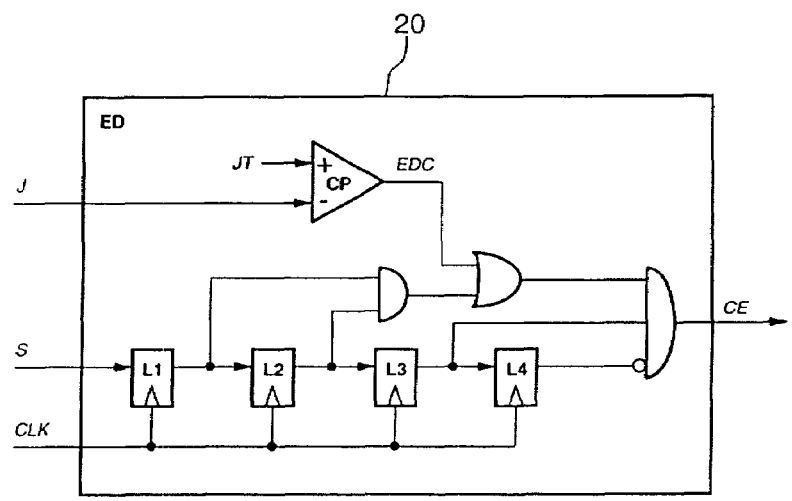
FIG. 7 shows a circuit diagram of a dual-mode edge detector that includes a comparator for edge detection control and four clocked storage latches to hold the four most recent samples of the input signal.

FIG. 7 shows a circuit diagram of the edge detector 20 which works in two modes, whose output is labeled CE, that includes a comparator, labeled CP, whose output, labeled EDC, controls the conditions for the detection of a defined edge depending on a prestored threshold value, labeled JT. The edge detector 20 also includes four storage latches, denoted L1, L2, L3, and L4, used to hold the four most recent samples of the binary-quantized input signal S. Here, the first storage latch, labeled L1, also serves as a sampler 10. Further inputs are the signal quality measure J and the clock signal CLK that drives the storage latches and is identical with the previously defined clock signal CLK1, the first clock signal delivered by the synchronization unit 6 shown in FIG. 1a. Let the stored binary contents of the storage latches Ln, n=1, 2, 3, 4, be represented by the binary variables λn, n=1, 2, 3, 4, respectively, and define the storage vector Γ=[λ1, λ2, λ3, λ4] where λn∈{0, 1}, n=1, 2, 3, 4. Assume further that the output of the edge detector 20, labeled CE, and the output of the comparator CP, labeled EDC, are both binary values from the set {0, 1}. Then, the edge detector 20 outputs CE=1, indicating the detection of a defined edge, when a) Γ=[1, 1, 1, 0] and EDC=0 or when b) Γ=[x, x, 1, 0] and EDC=1 where x means a don't care value; in all other cases CE=0, indicating that no defined edge has been detected. Note that EDC=1 when the inputs of the comparator CP are related as JT>J, otherwise EDC=0. It was found that the use of two different edge detection modes as explained above can improve the resolution of the channel quality measure J.

Figure 8:
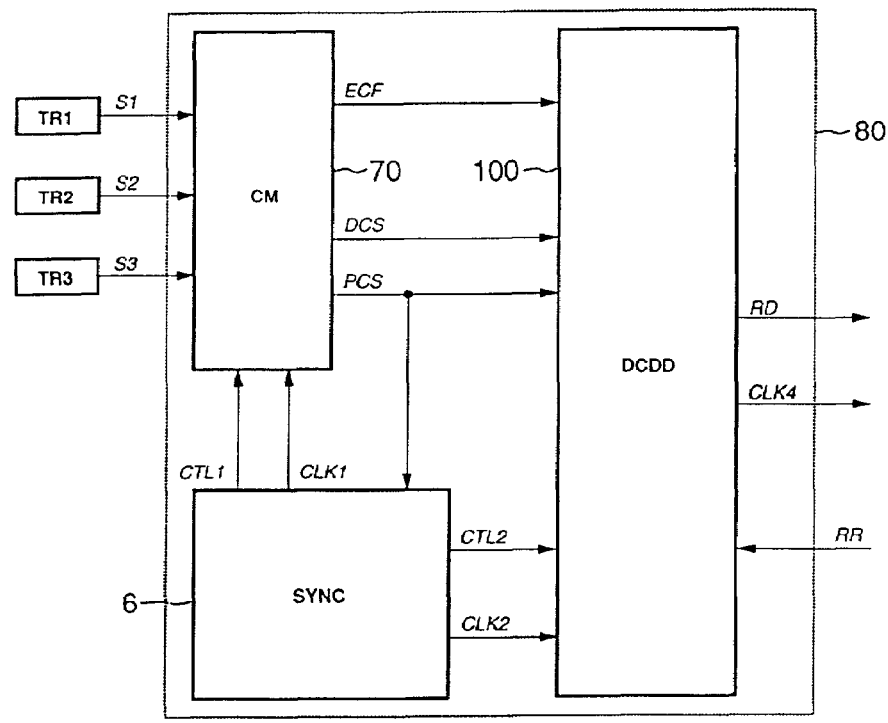
FIG. 8 shows a schematic illustration of an arrangement with three transceivers, the accompanying signals, a channel multiplexer for selecting a first digital signal and a second digital signal, the unit for synchronization, and a dual-channel data detector.

FIG. 8 shows a schematic illustration of an arrangement with three transceivers, labeled TR1, TR2, TR3, and the accompanying output signals, labeled S1, S2, S3, respectively, which feed a receiver system 80 that includes a channel multiplexer 70, here also simply called selector 70, a unit for synchronization 6, and a dual-channel data detector 100. Each of the three transceivers delivers a binary-quantized signal to the channel multiplexer 70 that delivers a first digital signal, called the primary channel signal, hereafter abbreviated by PCS and characterized as the received signal with the best signal quality measure, and a second digital signal, called the diversity channel signal, hereafter abbreviated by DCS and characterized as the received signal with the second-best signal quality measure, for further processing by the dual-channel data detector 100. By using the PCS as well as the DCS, in contrast to a single-channel data detector 7 using only the PCS, a dual-channel data detector 100 generally achieves an improved error-rate performance. The PCS is also connected to the synchronization unit 6 which can be identical with the synchronization unit 6 that was already introduced and described in accordance with FIG. 1a. The synchronization unit 6 feeds a first control signal, hereafter abbreviated to CTL1, and a first clock signal, hereafter abbreviated to CLK1, to the channel multiplexer 70. The synchronization unit 6 further feeds a second control signal, hereafter abbreviated to CTL2, and a second clock signal, hereafter abbreviated to CLK2, to the dual-channel data detector 100; the latter receives also a further control signal from the channel multiplexer 70, labeled ECF. The dual-channel data detector 100 outputs a received data signal, labeled RD, and a fourth clock signal, labeled CLK4. The dual-channel data detector 100 receives as a further input a control signal carrying information about the data rate reduction factor, labeled RR. The synchronization unit 6 and the dual-channel data detector 100 can be parts of some controller module that contains further reception and transmission functions. In a further embodiment of the scheme disclosed in FIG. 8, the channel multiplexer 70, the synchronization unit 6, and the dual-channel data detector 100 can all be combined within such a controller module. Subsequently, the channel multiplexer 70 and the dual-channel data detector 100 will be described in more detail.

Figure 9:
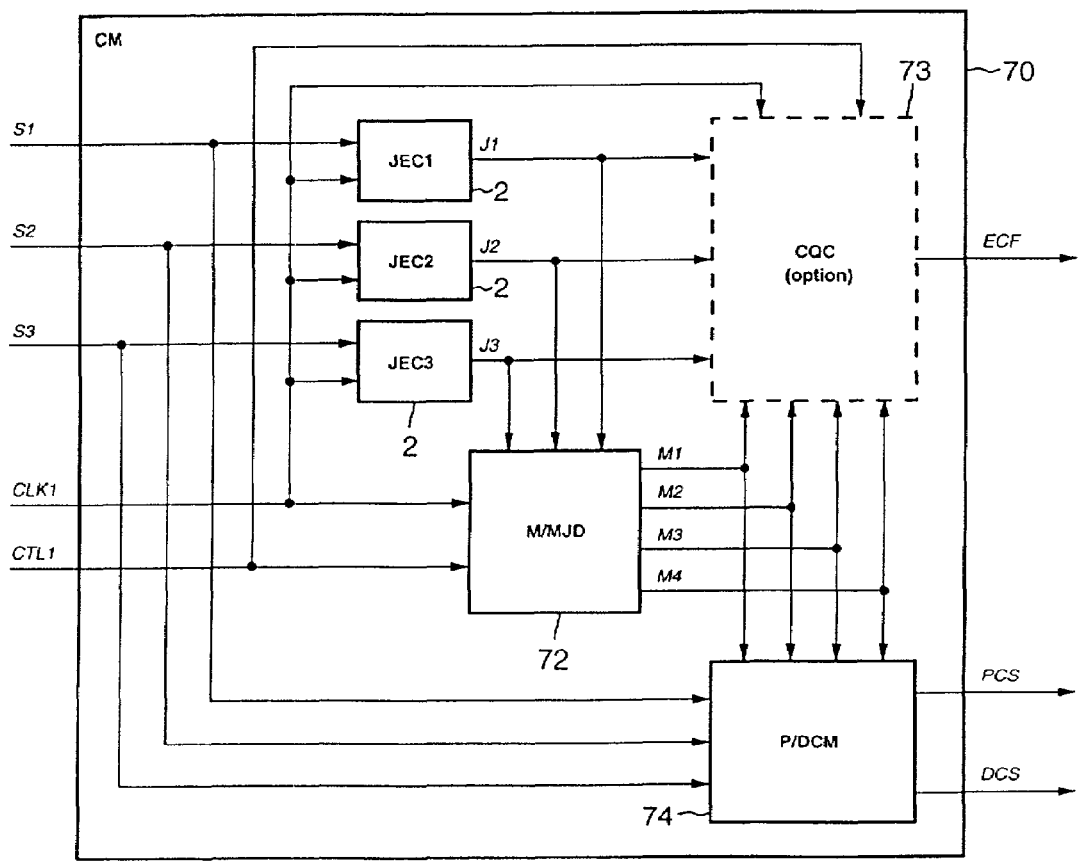
FIG. 9 shows a more detailed illustration of the channel multiplexer containing for each channel the jitter estimator, a minimum-maximum detector, a diversity multiplexer and a channel quality comparator.

FIG. 9 shows in more detail that the channel multiplexer 70 contains for each of the three channels the jitter estimator 2, a minimum-maximum detector 72, and a diversity multiplexer 74 for the selection of the PCS and the DCS. Each of the three jitter estimators 2 receives one binary input signal, labeled S1, S2, and S3, and outputs the channel quality measure, labeled J1, J2, and J3, respectively; the binary input signal S1, S2, and S3, are also connected to the diversity multiplexer 74. The channel quality measures, J1, J2, and J3, are evaluated by the minimum-maximum detector 72 to generate the selection signals M1 and M2 that select the PCS and the selection signals M3 and M4 that select the DCS at the output of the diversity multiplexer 74. The three jitter estimators 2 are all driven by the clock signal CLK1 and the minimum-maximum detector 72 uses control signal CTL1 and clock signal CLK1. Note that the jitter estimator 2 used in this scheme is identical with the jitter estimator 2 previously described in detail with reference to FIGS. 5, 6, and 7 of the present description. The channel multiplexer 70 can be enhanced with a channel quality comparator 73 that outputs the further control signal ECF and receives the clock signal CLK1, the control signal CTL1, the channel quality measures J1, J2, and J3, and the selection signals M1, M2, M3, and M4. The further control signal ECF can be used by the dual-channel data detector 100. Subsequently, the minimum-maximum detector 72, the diversity multiplexer 74, and the optional channel quality comparator 73, will be described in more detail.

FIG. 10 shows in detail the minimum-maximum detector 72 that compares three input values, labeled J1, J2, and J3, by using three comparators, labeled CP1, CP2, and CP3, that assign binary values to their outputs, labeled O1, O2, and O3, respectively. From these output values the selection signals for the diversity multiplexer 74, labeled M1, M2, M3, and M4, are then generated by using digital logic circuits and storing the selection signals in storage latches, labeled PL, that are driven by the previously defined clock signal CLK1 and control signal CTL1. Note that the output of a comparator CP1, CP2, or CP3, is only asserted (i.e., takes on the digital logic's TRUE level) when the comparator's positive input value, labeled +, is greater than its negative input value, labeled −.

FIG. 11 shows the schematics of the diversity multiplexer 74 with inputs labeled S1, S2, and S3, and constructed with a first multiplexer circuit, labeled MUX1, that selects the PCS based on the selection signals M1 and M2, and a second multiplexer circuit, labeled MUX2, that selects the DCS based on the selection signals M3 and M4.

FIG. 12 shows the basic blocks, as introduced in FIG. 8, of the dual-channel data detector 100 that includes a dual-channel symbol detector 101, hereinafter simply called the channel detector 101, for determining a pulse position, labeled DDS, that bases on both the PCS and the DCS applied to its inputs, and further includes a variable-rate data detector 103 designed for processing the pulse position information. In this embodiment, the pulse position determined by the channel detector 101 is that of 4-PPM symbols. The channel detector 101 supplies a third clock signal, labeled CLK3, to the variable-rate data detector 103 and it receives a further input, labeled ECF, that is provided by the channel multiplexer 70 for the selection of two different detection modes. Both, the channel detector 101 and the variable-rate data detector 103 use the clock signal CLK2 and the control signal CTL2 as provided by the synchronization unit 6. The variable-rate data detector 103 outputs a received data signal, labeled RD, and a fourth clock signal, labeled CLK4 and it receives as a further input control signal, labeled RR, that carries information about the data rate reduction factor. Subsequently, the dual-channel symbol detector 101, also simply called the channel detector 101, will be described in more detail.

Figure 13:
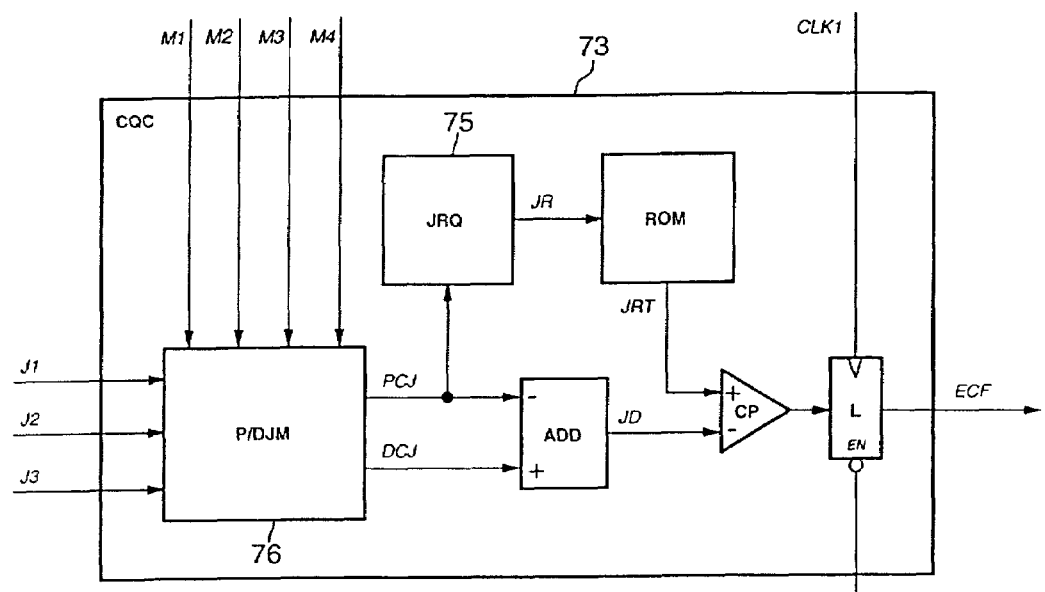
FIG. 13 shows a block diagram of the channel quality comparator with a jitter multiplexer, a jitter range quantizer, a memory unit, an adder, a comparator, and a clocked storage latch.

FIG. 13 shows the elements of the channel quality comparator 73 which includes a jitter multiplexer 76, a jitter range quantizer 75, an adder labeled ADD, a memory labeled ROM, a comparator labeled CP, and a storage latch, labeled L. The latter delivers its output signal, labeled ECF, to the channel detector 101. The jitter multiplexer 76 receives its inputs, labeled J1, J2, and J3, from the jitter estimators 2 and its selection signals, labeled M1, M2, M3, and M4, from the minimum-maximum detector 72. The jitter multiplexer 76 outputs the primary channel jitter, hereafter abbreviated to PCJ, which corresponds to the jitter contained in the PCS, and the diversity channel jitter, hereafter abbreviated to DCJ, which corresponds to the jitter contained in the DCS. Depending on the value of the PCJ, the jitter range quantizer 75 provides the address, labeled JR, for the memory ROM which then outputs a threshold value, labeled JRT. The adder ADD computes the difference JD=DCJ−PCJ and the comparator CP asserts its output when its inputs are such that JRT>JD. Depending on the value of the control signal CTL1 and the clock signal CLK1, the storage latch L stores the binary output value of the comparator CP to generate the control signal ECF.

Figure 14:
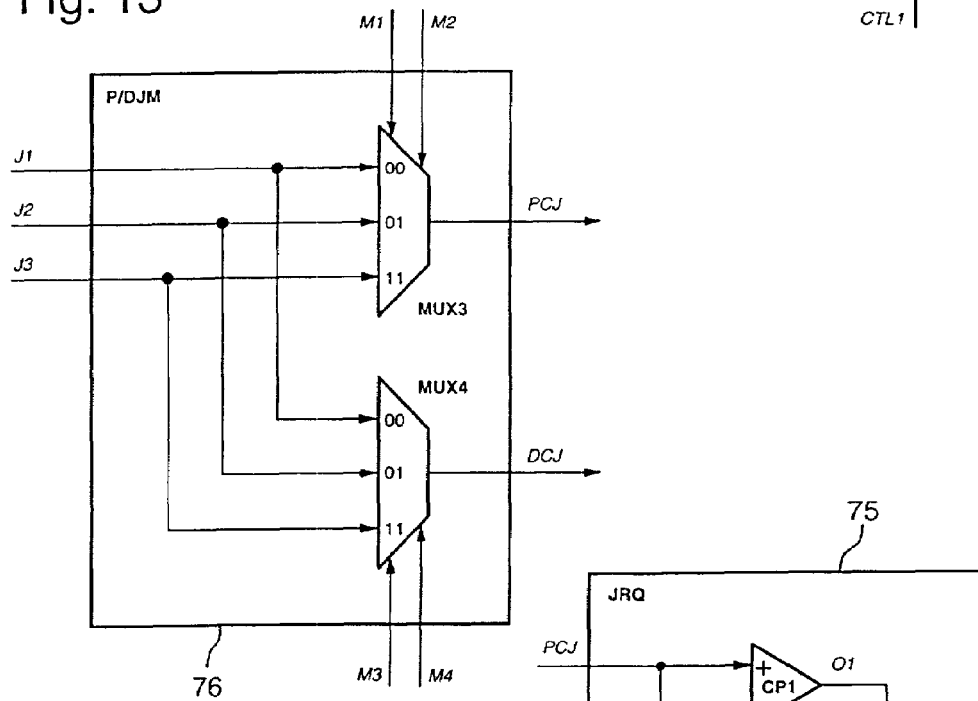
FIG. 14 shows a first and second jitter multiplexer for the selection of a first and second jitter value.

FIG. 14 shows the schematics of the jitter multiplexer 76 with inputs labeled J1, J2, and J3, and constructed with a third multiplexer circuit, labeled MUX3, that selects the PCJ based on the selection signals M1 and M2, and a fourth multiplexer circuit, labeled MUX4, that selects the DCJ based on the selection signals M3 and M4.

Figure 15:
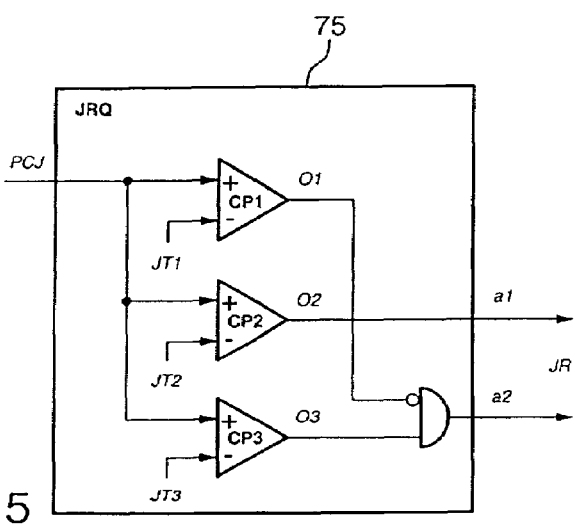
FIG. 15 shows a schematics of a jitter range quantizer with three comparators and digital logic circuits.

FIG. 15 shows in detail the jitter range quantizer 75 that derives from the PCJ input the two address bits for the memory ROM, labeled JR=(a1, a2), by using three comparators, labeled CP1, CP2, and CP3, that assign binary values to their outputs, labeled O1, O2, and O3, respectively. Note that the output of each comparator, CP1, CP2, or CP3, is only asserted (i.e., takes on the digital logic's TRUE level) when the comparator's positive input value, labeled +, is greater than the threshold, JT1, JT2, or JT3, respectively, that is applied to its negative input, labeled −.

Figure 16:
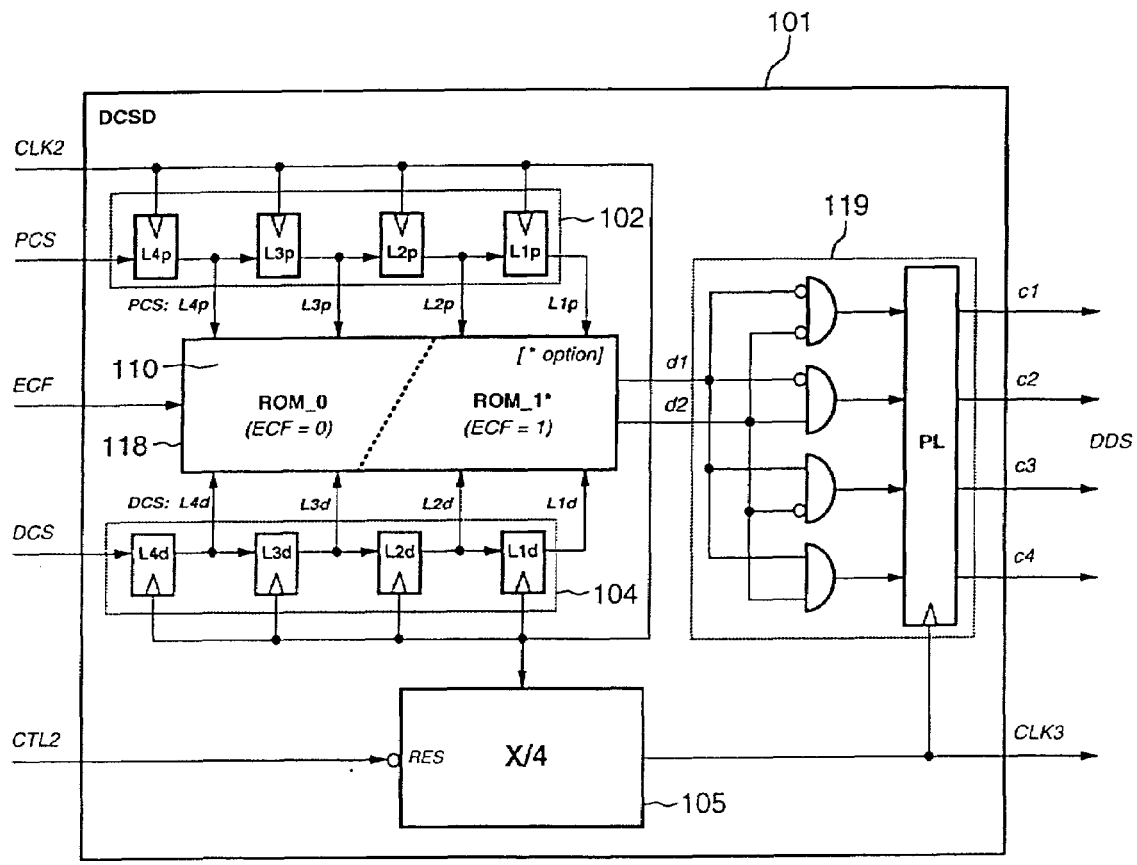
FIG. 16 shows a schematics of the dual-channel symbol detector, also simply called channel detector, with a first storage unit holding the last four samples of a first digital signal, a second storage unit holding the last four samples of a second digital signal, a determination unit with probability tables, a divide-by-four circuit, and logic circuits feeding storage latches to hold the detected pulse position.

FIG. 16 shows a schematic illustration of the channel detector 101 for determining a pulse position at its output, labeled DDS=[c1, c2, c3, c4], that bases on the inputs of the first digital signal with the best signal quality measure, earlier abbreviated to PCS, and the second digital signal with the second-best signal quality measure, earlier abbreviated to DCS. The channel detector 101, further comprises a first storage unit 102 for storing at least one symbol of the PCS, a second storage unit 104 for storing at least one symbol of the DCS, where both storage units are driven by the earlier defined clock signal CLK2, and a determination unit 118 comprising at least one probability table 110, which in case that the PCS and the DCS are received is addressed with the at least one symbol of the PCS and the at least one symbol of the DCS, thereby providing two bits, labeled d1 and d2, at the output of the determination unit 118 that are fed to the 4-PPM symbol mapping circuit 119 to generate the pulse position DDS according to the following table:

| Outputs of determination unit 118: [d1, d2] | Pulse position for 4-PPM: DDS = [c1, c2, c3, c4] | Entry of probability table 110: # of chip with pulse |
| --- | --- | --- |
| [0, 0] | [1, 0, 0, 0] | 1 |
| [0, 1] | [0, 1, 0, 0] | 2 |
| [1, 0] | [0, 0, 1, 0] | 3 |
| [1, 1] | [0, 0, 0, 1] | 4 |

The four bits c1, c2, c3, and c4, representing the pulse position DDS, are stored in storage latches, labeled PL, driven by a clock signal, labeled CLK3, that a divide-by-four clock divider 105 derives from the earlier defined clock signal CLK2 and the earlier defined control signal CTL2 by connecting it to the reset input of the divide-by-four divider 105, labeled RES, for synchronization of the clock signal CLK3 with the 4-PPM symbol boundaries. A further input to the determination unit 118, labeled ECF, is provided by the channel quality comparator 73 for selecting between two different probability tables 110, labeled ROM_0 and ROM_1, to enable different detection modes; here, detection mode ROM_0 is enabled when ECF=0 and the optional detection mode ROM_1 is enabled when ECF=1. The described channel detector 101 can achieve an effective gain in terms of the signal-to-noise ratio, compared to a common single-channel data detector 7.

FIG. 17 shows an example of the contents of the determination unit 118 in the form of the probability table 110, also labeled ROM_0. The table defines the addresses and the contents of the determination unit 118 when the control signal ECF=0. The address bits consisting of four samples of the PCS that are held, as indicated in FIG. 16, by the latches of a first storage unit 102, denoted L1p, L2p, L3p, and L4p, and four samples of the DCS that are held by the latches of a second storage unit 104, denoted L1d, L2d L3d, and L4d, are listed in the table with their decimal value where the least significant bit is as indicated in the right-most position. Each addressed table entry represents a 4-PPM symbol where the number of the entry defines the position of the symbol chip carrying the pulse, according to the 4-PPM symbol mapping rules defined in the table above. This probability table ROM_0 is an asymmetric probability table 110 which represents an asymmetric dual-channel symbol detector 101, designed under the assumption that the PCS is always of better quality than the DCS.

FIG. 18 shows another example of the contents of the determination unit 118 in the form of the probability table 110, also labeled ROM_1. The table defines the addresses and the contents of the determination unit 118 when the control signal ECF=1. The address bits consisting of four samples of the PCS that are held, as indicated in FIG. 16, by the latches of a first storage unit 102, denoted L1p, L2p, L3p, and L4p, and four samples of the DCS that are held by the latches of a second storage unit 104, denoted L1d, L2d L3d, and L4d, are listed in the table with their decimal value where the least significant bit is as indicated in the right-most position. Each addressed table entry represents a 4-PPM symbol where the number of the entry defines the position of the symbol chip carrying the pulse, according to the 4-PPM symbol mapping rules defined in the table above. This probability table ROM_1 is a symmetric probability table 110 which represents a symmetric dual-channel data detector 101, designed under the assumption that the PCS and the DCS are of equal quality.

Figure 19:
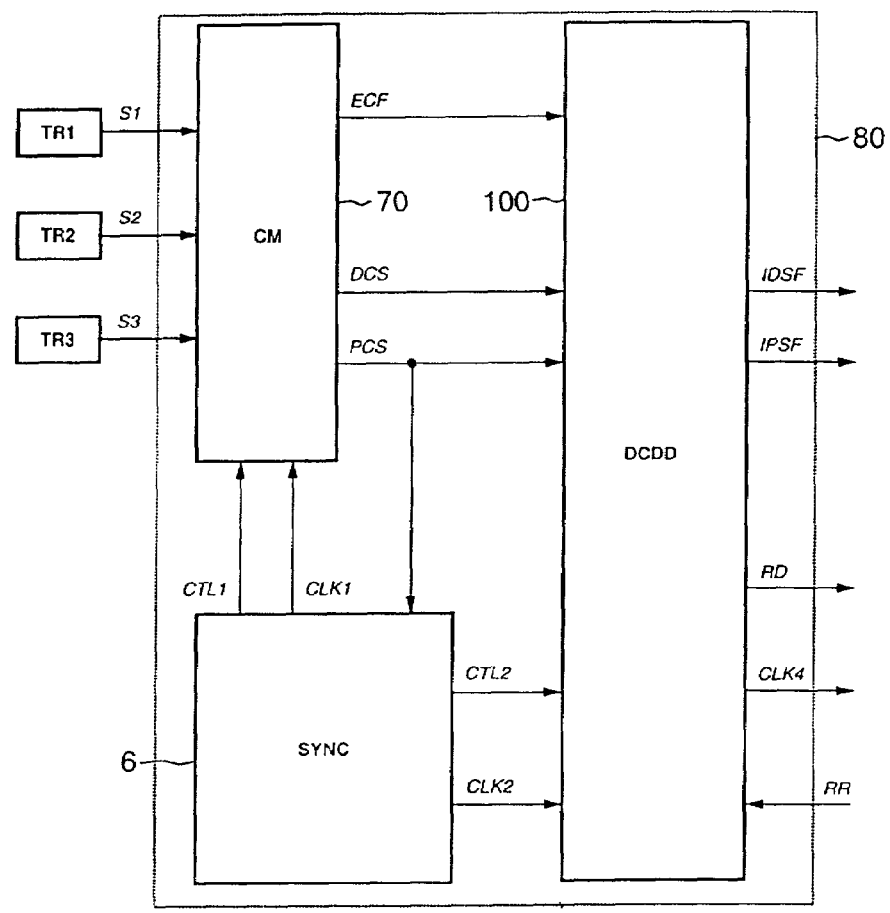
FIG. 19 shows a further schematic illustration of an arrangement with three transceivers, the accompanying signals, the channel multiplexer for selecting the first digital signal and the second digital signal, the unit for synchronization, and the dual-channel data detector.

FIG. 19 shows the same schematic illustration as in FIG. 8 of an arrangement with three transceivers, labeled TR1, TR2, TR3, and the accompanying output signals, labeled S1, S2, S3, respectively, which feed the receiver system 80 that includes the channel multiplexer 70, the unit for synchronization 6, and the dual-channel data detector 100, with the exception that the dual-channel data detector 100 in the present FIG. 19 also generates and outputs a first signaling bit, called illegal primary symbol flag and labeled IPSF, and a second signaling bit, called illegal diversity symbol flag and labeled IDSF. Ways to generate and use these additional signals will be described subsequently.

Figure 20:
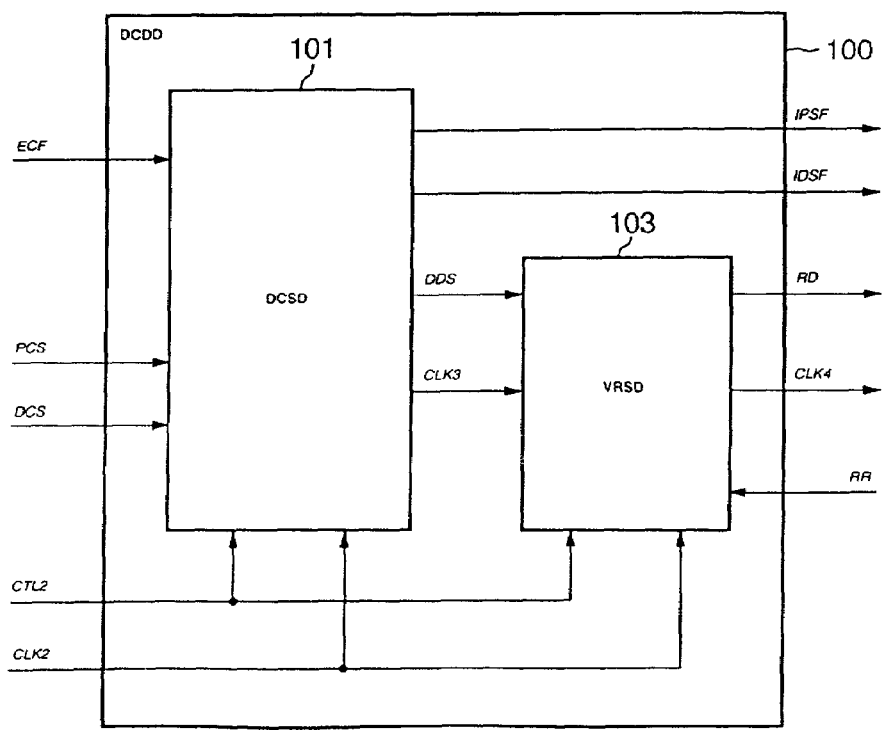
FIG. 20 shows further basic blocks of the dual-channel data detector with the dual-channel symbol detector and the variable-rate data detector.

FIG. 20 shows the same basic blocks of the dual-channel data detector 100 as in FIG. 12 that includes the channel detector 101 for determining a pulse position, labeled DDS, that bases on both the PCS and the DCS applied to its inputs, and further includes a variable-rate data detector 103 designed for processing the pulse position, with the exception that the dual-channel data detector 100 in the present FIG. 20 also generates and outputs the first signaling bit, labeled IPSF, and the second signaling bit, labeled IDSF. Ways to generate these additional signals will be described subsequently.

Figure 21:
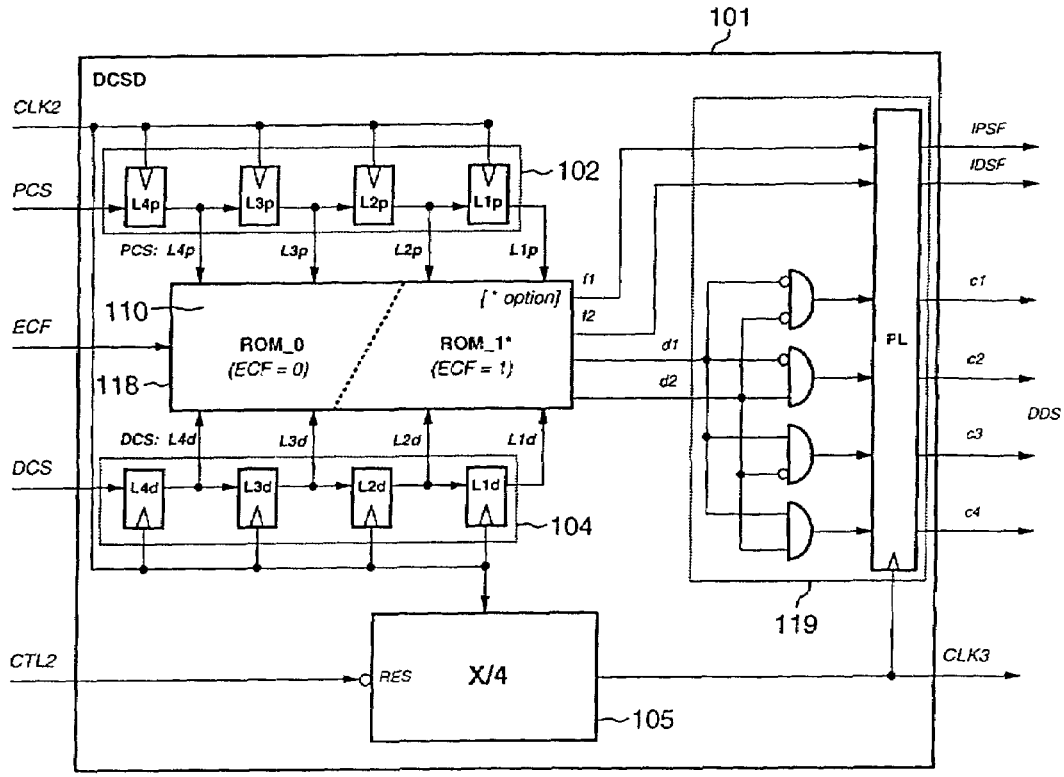
FIG. 21 shows another embodiment of the dual-channel symbol detector, where the determination unit includes additional tables of information to indicate whether the last four samples of the first digital signal form an illegal 4-PPM symbol and whether the last four samples of the second digital signal form an illegal 4-PPM symbol.

FIG. 21 shows the same schematics of the channel detector 101 as in FIG. 16 for determining a pulse position at its output, labeled DDS=[c1, c2, c3, c4], that bases on the inputs of the first digital signal with the best signal quality measure, earlier abbreviated to PCS, and the second digital signal with the second-best signal quality measure, earlier abbreviated to DCS, with the exception that the determination unit 118 not only comprises at least one probability table 110 as introduced in accordance with FIG. 16 and described in FIG. 17, but also includes an indication table that outputs a first indication bit, labeled f1, and a second indication bit, labeled f2, respectively. The indication bits f1 and f2 can be used to derive error statistics for the PCS and the DCS, respectively, that can be used to determine an appropriate data rate reduction factor RR in a 4-PPM/variable-rate unit. For the sake of clarity, the indication table as well as the 4-PPM/variable-rate unit are not shown in FIG. 21. In case that the PCS and the DCS are received, the first indication bit f1 is only asserted (i.e., takes on the digital logic's TRUE level) when the four samples in the first storage unit 102 represent an illegal 4-PPM symbol and the second indication bit f2 is only asserted (i.e., takes on the digital logic's TRUE level) when the four samples in the second storage unit 104 represent an illegal 4-PPM symbol. Both indication bits f1 and f2 are stored in storage latches, labeled PL, driven by the clock signal, labeled CLK3, the divide-by-four clock divider 105 derives from the earlier defined clock signal CLK2 and the earlier defined control signal CTL2 by connecting it to the reset input of the divide-by-four divider 105, labeled RES, for synchronization of the clock signal CLK3 with the 4-PPM symbol boundaries.

Figure 22:
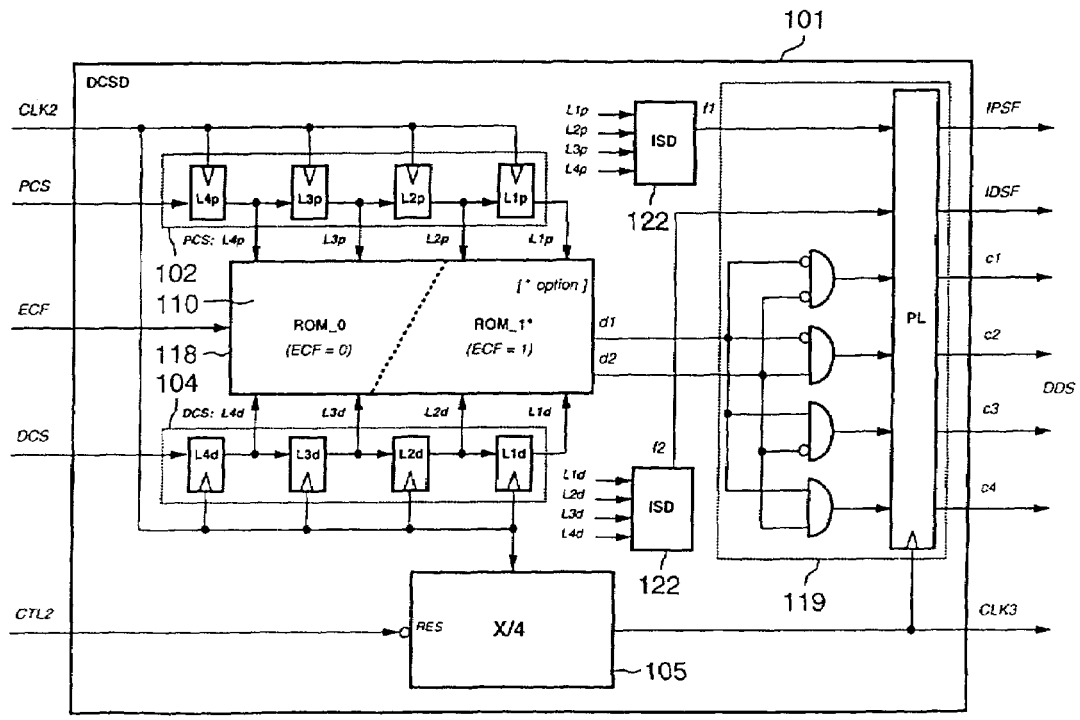
FIG. 22 shows yet another embodiment of the dual-channel symbol detector where illegal symbol detectors generate information to indicate whether the last four samples of the first digital signal form an illegal 4-PPM symbol and whether the last four samples of the second digital signal form an illegal 4-PPM symbol.

FIG. 22 shows again the same schematics of the channel detector 101 as in FIG. 16 for determining a pulse position at its output, labeled DDS=[c1, c2, c3, c4], that bases on the inputs of the first digital signal with the best signal quality measure, earlier abbreviated to PCS, and the second digital signal with the second-best signal quality measure, earlier abbreviated to DCS, with the exception that the present scheme includes in addition two illegal symbol detectors 122 that here generate and output the first indication bit, labeled f1, and the second indication bit, labeled f2, respectively. In case that the PCS and the DCS are received, the first indication bit f1 is only asserted (i.e., takes on the digital logic's TRUE level) when the four samples in the first storage unit 102 represent an illegal 4-PPM symbol and the second indication bit f2 is only asserted (i.e., takes on the digital logic's TRUE level) when the four samples in the second storage unit 104 represent an illegal 4-PPM symbol. Both indication bits f1 and f2 are stored in storage latches, labeled PL, driven by a clock signal, labeled CLK3, that a divide-by-four clock divider 105 derives from the earlier defined clock signal CLK2 and the earlier defined control signal CTL2 by connecting it to the reset input of the divide-by-four divider 105, labeled RES, for synchronization of the clock signal CLK3 with the 4-PPM symbol boundaries. As indicated above, the indication bits f1 and f2 can be used to derive error statistics for the PCS and the DCS, respectively, and allows to determine the data rate reduction factor RR.

Any disclosed embodiment may be combined with one or several of the other embodiments shown and/or described. This is also possible for one or more features of the embodiments. The steps herein described and claimed do not need to be executed in the given order. The steps can be carried out, at least to an extent, in any other order.

The invention claimed is:

1. An apparatus for determining the quality of a digital signal, comprising
   a sampler using clock cycles for sampling the digital signal with a number n of samples per defined pulse width, whereby n≧1;
   an edge detector for detecting an edge of a pulse of the sampled digital signal;
   a counter for counting the clock cycles between edges detected by the edge detector;
   a deviation detector being able to compare the counted clock cycles with a prestored reference-value in order to provide a deviation value as a measure for the instantaneous quality of the digital signal; and
   an absolute-value limiter unit for generating an absolute deviation value in response to the deviation value and a storage latch for storing the absolute deviation value.

2. Apparatus according to claim 1, comprising a leaky integrator (50) for generating a signal quality measure (J) in response to the absolute deviation value (PJ).

3. Apparatus according to claim 2, wherein the leaky integrator (50) has a leak factor β having a power-of-two value of the form $2^{-m}$ with m>0 such that β is in the range 0<β≦1.

4. Apparatus according to claim 1, wherein the edge detector (20) bases edge detection on a first sample value and at least one second sample value.

5. Apparatus according to claim 1, wherein the counter (30) comprises an up-counter, preferably a modulo N counter, where N is an integer number.

6. Apparatus according to claim 1, wherein the deviation detector (40) comprises a comparator (44) that provides a positive or negative deviation value (RJ).

7. Apparatus according to claim 1, wherein the digital signal (S) is encoded by a pulse modulation, preferably a Pulse Position Modulation (PPM), and wherein the digital signal (S) represents data carried in frames comprising at least a header field which contains a preamble and a data field.

8. Apparatus according to claim 7, wherein the quality of the digital signal (S) is determinable within the preamble.

9. Apparatus according to claim 1, wherein the digital signal (S) comprises an infrared signal.

10. Apparatus according to claim 1, wherein the digital signal (S) comprises noisy signals containing no data.

11. A selector having multiple channels, logic for selecting a subset of said channels for further processing, and apparatus associated with each of said channels for determining the quality of a digital signal comprising:
    a sampler using clock cycles for sampling the digital signal with a number n of samples per defined pulse width, where n ≧1;
    an edge detector for detecting an edge of a pulse of the sampled digital signal;
    a counter for counting the clock cycles between edges detected by the edge detector; and
    a deviation detector being able to compare the counted clock cycles with a prestored reference-value in order to provide a deviation value as a measure for the instantaneous quality of the digital signal;
    wherein the logic comprises a minimum detector for detecting a digital signal with the best signal quality measure and a primary multiplexer for selecting the digital signal for further processing.

12. A selector having multiple channels, logic for selecting a subset of said channels for further processing, and apparatus associated with each of said channels for determining the quality of a digital signal, comprising:
    a sampler using clock cycles for sampling the digital signal with a number n of samples per defined pulse width, whereby n≧1;
    an edge detector for detecting an edge of a pulse of the sampled digital signal;
    a counter for counting the clock cycles between edges detected by the edge detector; and
    a deviation detector being able to compare the counted clock cycles with a prestored reference-value in order to provide a deviation value as a measure for the instantaneous quality of the digital signal;
    wherein the logic comprises a minimum-maximum detector for detecting a first digital signal with the best signal quality measure and a second digital signal with the second-best quality measure and a diversity multiplexer for selecting these digital signals for further processing.

13. A selector (70) according to claim 12, wherein the logic (73) comprises a channel quality comparator (73) for providing a control signal (ECF).

14. A receiver system including a channel multiplexer having logic including a minimum-maximum detector for detecting a first digital signal with best signal quality measure and a second digital signal with second-best quality measure and a diversity multiplexer for selecting these digital signals for further processing and a channel detector for determining a pulse position that bases on the first digital signal with the best signal quality measure and the second digital signal with the second-best signal quality measure, the apparatus comprising:
 a first storage unit for storing at least one symbol of the first digital signal with the best signal quality measure;
 a second storage unit (104) for storing at least one symbol of the second digital signal with the second-best signal quality measure (DCS); and
 a determination unit comprising a probability table, which in case that the first and second digital signals are received, is addressed with the at least one symbol of the first digital signal with the best signal quality measure and the at least one symbol of the second digital signal with the second-best signal quality measure, thereby providing a value that is defined as the pulse position.

15. The receiver of claim 14, wherein the logic comprises a channel quality comparator for providing a control signal.

16. A method for determining the quality of a digital signal, comprising:
 sampling the digital signal with a number n of samples per defined pulse width, where $n \geq 1$;
 detecting an edge of a pulse of the sampled digital signal;
 counting the clock cycles between edges;
 comparing the counted clock cycles with a prestored reference-value in order to output a deviation value as a measure for the instantaneous quality of the digital signal; and
 feeding the deviation value to an absolute-value limiter unit that provides an absolute deviation value and feeding the absolute deviation value to a storage latch that outputs the absolute deviation value for further processing.

17. Method according to claim 16 further comprising the step of feeding the absolute deviation value (PJ) to a leaky integrator (50) that outputs a signal quality measure (J).

18. Method according to claim 16 further comprising the step of detecting a first digital signal having the best signal quality measure (PCS) and selecting it for further processing.

19. Method according to claim 18 further comprising the step of detecting a second digital signal having the second-best signal quality measure (DCS) and selecting these signal (PCS, DCS) for further processing.

20. Method according to claim 16, wherein the quality of the digital signal (S) is determined within the preamble of the digital signal (S).

21. Method according to claim 19, wherein selecting the first digital signal (PCS) and the second digital signal (DCS) stops if the start of a symbol within the preamble of the digital signal (S) has been recognized, then the selection of the first digital signal (PCS) and the second digital signal (DCS) are retained.

22. Method according to claim 16, wherein the deviation value (RJ) and/or the signal quality measure (J) are/is determined for at least two digital signals, preferably for three digital signals.

23. A method for determining quality of a digital signal comprising:
 sampling the digital signal with a number n of samples per defined pulse width, where $n \geq 1$;
 detecting an edge of a pulse of the sampled digital signal;
 counting the clock cycles between edges;
 comparing the counted clock cycles with a prestored reference-value in order to output a deviation value as a measure for the instantaneous quality of the digital signal; and
 further comprising the following steps for determining a pulse position for the digital signal, which is received as at least the first digital signal and the second digital signal:
 storing a probability table;
 storing at least one symbol of the first digital signal;
 storing at least one symbol of the second digital signal; and
 addressing the probability table with the at least one symbol of the first digital signal and the at least one symbol of the second digital signal, whereby the probability table provides a value that is defined as the pulse position.

* * * * *